US008495125B2

(12) United States Patent
Catherwood et al.

(10) Patent No.: US 8,495,125 B2
(45) Date of Patent: Jul. 23, 2013

(54) DSP ENGINE WITH IMPLICIT MIXED SIGN OPERANDS

(75) Inventors: Michael I. Catherwood, Georgetown, TX (US); Settu Duraisamy, Bangalore (IN)

(73) Assignee: Microchip Technology Incorporated, Chandler, AZ (US)

( * ) Notice: Subject to any disclaimer, the term of this patent is extended or adjusted under 35 U.S.C. 154(b) by 729 days.

(21) Appl. No.: 12/776,193

(22) Filed: May 7, 2010

(65) Prior Publication Data

US 2010/0306292 A1 Dec. 2, 2010

Related U.S. Application Data

(60) Provisional application No. 61/181,468, filed on May 27, 2009.

(51) Int. Cl.
*G06F 7/52* (2006.01)

(52) U.S. Cl.
USPC .......................................... 708/625; 708/632

(58) Field of Classification Search
USPC .......................................... 708/625, 627, 632
See application file for complete search history.

(56) References Cited

U.S. PATENT DOCUMENTS

| 5,446,651 | A | 8/1995 | Moyse et al. ................. 364/760 |
| 5,920,497 | A * | 7/1999 | Rim .............................. 708/620 |
| 6,230,253 | B1 | 5/2001 | Roussel et al. ................. 712/22 |
| 6,233,597 | B1 * | 5/2001 | Tanoue et al. ................. 708/625 |
| 7,392,276 | B2 * | 6/2008 | Dupaquis et al. ............. 708/625 |
| 7,809,783 | B2 * | 10/2010 | Krithivasan et al. .......... 708/628 |
| 2004/0230631 | A1 | 11/2004 | Busaba et al. ................ 708/620 |

FOREIGN PATENT DOCUMENTS

WO 99/21078 A2 4/1999

OTHER PUBLICATIONS

International PCT Search and Written Opinion, PCT/US2010/035774, 12 pages, mailed Sep. 6, 2010.

* cited by examiner

*Primary Examiner* — Chuong D Ngo
(74) *Attorney, Agent, or Firm* — King & Spalding L.L.P.

(57) ABSTRACT

A processor may have at least one multiplier unit which can be controlled to operate in a signed, an unsigned, or a mixed sign mode; a multiplier unit mode decoder coupled with the multiplier unit which receives location information of a first and second operands, wherein the multiplier mode decoder controls the multiplier unit when in the mixed sign mode depending on the location information to operate in a signed mode, an unsigned mode, or a combined signed/unsigned mode.

29 Claims, 16 Drawing Sheets

| Mode | Instr. | Input Operand 1 | | | Input Operand 2 | | | Multiplier Result (see note 2) | | | |
|---|---|---|---|---|---|---|---|---|---|---|---|
| | | Opr1<16> | Opr1<15> | Opr1<14:0> | Opr2<16> | Opr2<15> | Opr2<14:0> | R<32> (note 2) | R<31> | R<30> | R<29:1> | R<0> |
| Integer US<1:0>=x, IF=x | MUL.ss | Any W register | | | Any W register | | | | W0 through W12 pair | | | |
| | | S | S | D<14:0> | S | S | D<14:0> | x | S | S | R<29:1> | R<0> |
| | MUL.su | S | S | D<14:0> | 0 | 0 | D<14:0> | x | S | R<30> | R<29:1> | R<0> |
| | MUL.us | 0 | D<15> | D<14:0> | S | S | D<14:0> | x | S | R<30> | R<29:1> | R<0> |
| | MUL.uu | 0 | D<15> | D<14:0> | 0 | D<15> | D<14:0> | x | R<31> | R<30> | R<29:1> | R<0> |
| | MUL.w | 0 | D<15> | D<14:0> | 0 | D<15> | D<14:0> | x | R<31> | R<30> | R<29:1> | R<0> |
| | MUL.b | 0 | 0 | 6'b0:D<7:0> | 0 | 0 | 6'b0:D<7:0> | x | 0 | 0 | 14'b0 : R<15:1> | R<0> |
| Integer US<1:0>=x, IF=x | MUL.ss | Any W register | | | Any W register | | | | AccA or AccB | | | |
| | | S | S | D<14:0> | S | S | D<14:0> | S | S | R<30> | R<29:1> | R<0> |
| | MUL.su | S | S | D<14:0> | 0 | 0 | D<14:0> | S | S | R<30> | R<29:1> | R<0> |
| | MUL.us | 0 | D<15> | D<14:0> | S | S | D<14:0> | S | S | R<30> | R<29:1> | R<0> |
| | MUL.uu | 0 | D<15> | D<14:0> | 0 | D<15> | D<14:0> | 0 | R<31> | R<30> | R<29:1> | R<0> |
| | MUL.w | | | n/a | | | n/a | | | | | |
| | MUL.b | | | n/a | | | n/a | | | | | |
| Fractional US<1:0>=x, IF=x | MUL.ss | Any W register | | | Any W register | | | | AccA or AccB | | | |
| | | S | S | D<14:0> | S | S | D<14:0> | S | S | R<29> | R<28:0> | 0 |
| | MUL.su | S | S | D<14:0> | 0 | 0 | D<14:0> | S | S | R<29> | R<28:0> | 0 |
| | MUL.us | 0 | D<15> (=0) | D<14:0> | S | S | D<14:0> | S | S | R<29> | R<28:0> | 0 |
| | MUL.uu | 0 | D<15> (=0) | D<14:0> | 0 | D<15> (=0) | D<14:0> | 0 | S | R<29> | R<28:0> | 0 |
| | MUL.w | | | n/a | | | n/a | | | | | |
| | MUL.b | | | n/a | | | n/a | | | | | |

*Figure 5*

| Mode | Instr. | Opr1<16> | Opr1<15> | Opr1<14:0> | Opr2<16> | Opr2<15> | Opr2<14:0> | R<32> (note 2) | R<31> | R<30> | R<29:1> | R<0> |
|---|---|---|---|---|---|---|---|---|---|---|---|---|
| Signed Integer US<1:0>=00, IF=1 | ED, EDAC, MAC, MPY, MPYN¹, MSC¹ | S | S | D<14:0> | S | S | D<14:0> | R<32> | R<31> | R<30> | R<29:1> | R<0> |
| Signed Fractional US<1:0>=00, IF=0 | ED, EDAC, MAC, MPY, MPYN¹, MSC¹ | S | S | D<14:0> | S | S | D<14:0> | S | S | S | R<29:1> | R<0> |
| Unsigned Integer US<1:0>=01, IF=1 | ED, EDAC, MAC, MPY, MPYN¹, MSC¹ | 0 | D<15> | D<14:0> | 0 | D<15> | D<14:0> | 0 | R<31> | R<30> | R<29:1> | R<0> |
| Unsigned Fractional US<1:0>=01, IF=0 | ED, EDAC, MAC, MPY, MPYN¹, MSC¹ | 0 | D<15> (=0) | D<14:0> | 0 | D<15> (=0) | D<14:0> | 0 | 0 | R<29> | R<28:0> | 0 |

*Figure 6*

| Mode | Instr. | Input Operand 1 | | | Input Operand 2 | | | Multiplier Result (see note 2) | | | | |
|---|---|---|---|---|---|---|---|---|---|---|---|---|
| | | Opr1<16> | Opr1<15> | Opr1<14:0> | Opr2<16> | Opr2<15> | Opr2<14:0> | R<32> (note 2) | R<31> | R<30> | R<29:1> | R<0> |
| Mixed Sign Integer US<1:0>=1x, IF=1 | ED, EDAC, MAC, MPY MPYN¹, MSC¹ | 0 | W4 or W6 | | 0 | W6 or W4 | | Operation: UU | | | | |
| | | | | | | | | 0 | 0 | R<29> | R<28:0> | 0 |
| | | 0 | D<15> | D<14:0> | 0 | D<15> | D<14:0> | Operation: SS | | | | |
| | | | W5 or W7 | | | W7 or W5 | | S | S | S | R<29:1> | R<0> |
| | | S | D<14:0> | | S | D<14:0> | | Operation: US | | | | |
| | | | W4 or W6 | | | W5 or W7 | | S | S | R<30> | R<29:1> | R<0> |
| | | 0 | D<15> | D<14:0> | S | D<14:0> | | Operation: SU | | | | |
| | | | W5 or W7 | | | W4 or W6 | | S | S | R<30> | R<29:1> | R<0> |
| | | S | D<14:0> | | 0 | D<15> | D<14:0> | Operation: UU | | | | |
| Mixed Sign Fractional US<1:0>=1x, IF=0 | ED, EDAC, MAC, MPY MPYN¹, MSC¹ | 0 | W4 or W6 | | 0 | W6 or W4 | | 0 | 0 | R<29> | R<28:0> | 0 |
| | | 0 | D<15> (=0) | D<14:0> | 0 | D<15> (=0) | D<14:0> | Operation: SS | | | | |
| | | | W5 or W7 | | | W7 or W5 | | S | S | R<29> | R<28:0> | 0 |
| | | S | D<14:0> | | S | D<14:0> | | Operation: US | | | | |
| | | | W4 or W6 | | | W5 or W7 | | S | S | R<29> | R<28:0> | 0 |
| | | 0 | D<15> (=0) | D<14:0> | S | D<14:0> | | Operation: SU | | | | |
| | | | W5 or W7 | | | W4 or W6 | | S | S | R<29> | R<28:0> | 0 |
| | | S | D<14:0> | | 0 | D<15> (=0) | D<14:0> | | | | | |

Note 1: Result is negated at accumulator
2: Result after scaler for DSP & MCU instructions targeting an accumulator, otherwise directly from multiplier

*Figure 7*

| Instruction | Mode BIDIR | Direction | Shift Range | Direction L_R | Shift Magnitude Range SFTNUM<4:0> |
|---|---|---|---|---|---|
| ASRK | 0 | Right | 0 to 15 | 0 | %00000 to %01111 |
| LSRK | 0 | Right | 0 to 15 | 0 | %00000 to %01111 |
| SLK | 0 | Left | 0 to 15 | 1 | %00000 to %01111 |
| SFTACK | 1 | Right | 0 to 16² | 0 | %00000 to %10000 |
| | | Left | 1 to 16² | 1 | %11111 to %01111 |
| ASRW | 0 | Right | 0 to 15¹ | 0 | %00000 to %01111 |
| LSRW | 0 | Right | 0 to 15¹ | 0 | %00000 to %01111 |
| SLW | 0 | Left | 0 to 15¹ | 1 | %00000 to %01111 |
| SFTAC | 1 | Right | 0 to 16² | 0 | %00000 to %10000 |
| | | Left | 1 to 16² | 1 | %11111 to %10000 |

*Figure 9*

| Instruction | M1: BSI[39:32] BS Input | M2: BSI[31:16] BS Input | M3: BSI[15:0] BS Input | M4: BSout16 X-bus data |
|---|---|---|---|---|
| ADDAB A | x | x | x | x |
| ADDAB B | x | x | x | x |
| ADDAC A | SEout[39:32] | SEout[31:16] | SEout[15:0] | x |
| ADDAC B | SEout[39:32] | SEout[31:16] | SEout[15:0] | x |
| ASRW, ASRK | SEout[39:32] | SEout[31:16] | SEout[15:0] | BSO[31:16] |
| LSRW, LSRK | Zero | SEout[31:16] | Zero | BSO[31:16] |
| SLW, SLK | Zero | SEout[31:16] | Zero | BSO[31:16] |
| CLRAC A | Zero | Zero | Zero | x |
| CLRAC B | Zero | Zero | Zero | x |
| LAC | SEout[39:32] | SEout[31:16] | SEout[15:0] | x |
| MAC, SQRAC, EDAC A | SEout[39:32] | SEout[31:16] | SEout[15:0] | x |
| MAC, SQRAC, EDAC B | SEout[39:32] | SEout[31:16] | SEout[15:0] | x |
| MOVSAC A | x | x | x | x |
| MOVSAC B | x | x | x | x |
| MPY, SQR, ED A | SEout[39:32] | SEout[31:16] | SEout[15:0] | x |
| MPY, SQR, ED B | SEout[39:32] | SEout[31:16] | SEout[15:0] | x |
| MPYN A | SEout[39:32] | SEout[31:16] | SEout[15:0] | x |
| MPYN B | SEout[39:32] | SEout[31:16] | SEout[15:0] | x |
| MSA A | SEout[39:32] | SEout[31:16] | SEout[15:0] | x |
| MSA B | SEout[39:32] | SEout[31:16] | SEout[15:0] | x |
| NEG A | x | x | x | x |
| NEG B | x | x | x | x |
| SAC, SRAC A | ACCout1[39:32] | ACCout1[31:16] | ACCout1[15:0] | x |
| SAC, SRAC B | ACCout1[39:32] | ACCout1[31:16] | ACCout1[15:0] | x |
| SFTAC A | ACCout1[39:32] | ACCout1[31:16] | ACCout1[15:0] | x |
| SFTAC B | ACCout1[39:32] | ACCout1[31:16] | ACCout1[15:0] | x |
| SUBAB A | x | x | x | x |
| SUBAB B | x | x | x | x |

*Figure 10*

| Instruction | M1:BSI[39:32] BS input | M2:BSI[31:16] BS input | M3:BSI[15:0] BS input | M4: BSout16 X-bus data |
|---|---|---|---|---|
| ADDAB A | (Zero) | (Zero) | (Zero) | x |
| ADDAB B | (Zero) | (Zero) | (Zero) | x |
| CLRAC A | Zero | Zero | Zero | x |
| CLRAC B | Zero | Zero | Zero | x |
| MOVSAC A | (Zero) | (Zero) | (Zero) | x |
| MOVSAC B | (Zero) | (Zero) | (Zero) | x |
| NEG A | (Zero) | (Zero) | (Zero) | x |
| NEG B | (Zero) | (Zero) | (Zero) | x |
| SUBAB A | (Zero) | (Zero) | (Zero) | x |
| SUBAB B | (Zero) | (Zero) | (Zero) | x |
| ADDAC A | SEout[39:32] | SEout[31:16] | SEout[15:0] | x |
| ADDAC B | SEout[39:32] | SEout[31:16] | SEout[15:0] | x |
| LAC | SEout[39:32] | SEout[31:16] | SEout[15:0] | x |
| MAC, SQRAC, EDAC A | SEout[39:32] | SEout[31:16] | SEout[15:0] | x |
| MAC, SQRAC, EDAC B | SEout[39:32] | SEout[31:16] | SEout[15:0] | x |
| MPY, SQR, ED A | SEout[39:32] | SEout[31:16] | SEout[15:0] | x |
| MPY, SQR, ED B | SEout[39:32] | SEout[31:16] | SEout[15:0] | x |
| MPYN A | SEout[39:32] | SEout[31:16] | SEout[15:0] | x |
| MPYN B | SEout[39:32] | SEout[31:16] | SEout[15:0] | x |
| MSA A | SEout[39:32] | SEout[31:16] | SEout[15:0] | x |
| MSA B | SEout[39:32] | SEout[31:16] | SEout[15:0] | x |
| SAC, SRAC A | ACCout1[39:32] | ACCout1[31:16] | ACCout1[15:0] | x |
| SAC, SRAC B | ACCout1[39:32] | ACCout1[31:16] | ACCout1[15:0] | x |
| SFTAC A | ACCout1[39:32] | ACCout1[31:16] | ACCout1[15:0] | x |
| SFTAC B | ACCout1[39:32] | ACCout1[31:16] | ACCout1[15:0] | x |
| ASRW, ASRK LSRW, LSRK | Zero | SEout[31:16] | Zero | BSO[31:16] |
| SLW, SLK | x | Zero | SEout[31:16] | BSO[15:0] |

| Instruction | N1: IS Input Select | N2: ACSS1 Source Select 1 | N3: ACSS2 Source Select 2 | N4: ABYC Accumulate/ Bypass | N5: ADDIN Adder Input Select | N6: BSSS BS Source Select | N7: XRS X-bus Result Select |
|---|---|---|---|---|---|---|---|
| ADDAB A | x | Aout | Bout | ACCout1 | ACCout2 | x | x |
| ADDAB B | x | Bout | Aout | ACCout1 | ACCout2 | x | x |
| NEG A | x | x | Aout | Zero | ACCout2 | x | x |
| NEG B | x | x | Bout | Zero | ACCout2 | x | x |
| SUBAB A | x | Aout | Bout | ACCout1 | ACCout2 | x | x |
| SUBAB B | x | Bout | Aout | ACCout1 | ACCout2 | x | x |
| ADDAC A | ZBout | Aout | x | Zero | BSout40 | SEout | x |
| ADDAC B | ZBout | Bout | x | Zero | BSout40 | SEout | x |
| ASRW, ASRK LSRW, LSRK SLW, SLK | ZBout | x | x | x | x | x¹ | BSout16 |
| CLRAC A | | x | Bout | Zero | BSout40 | x² | Rout |
| CLRAC B | | x | Aout | Zero | BSout40 | x² | Rout |
| LAC | ZBout | x | x | Zero | BSout40 | SEout | x |
| MAC, SQRAC, EDAC A | MULout | Aout | Bout | ACCout1 | BSout40 | SEout | Rout |
| MAC, SQRAC, EDAC B | MULout | Bout | Aout | ACCout1 | BSout40 | SEout | Rout |
| MSA A | MULout | Aout | Bout | ACCout1 | BSout40 | SEout | Rout |
| MSA B | MULout | Bout | Aout | ACCout1 | BSout40 | SEout | Rout |
| MOVSAC A | (MULout) | (Aout) | Bout | (ACCout1) | (BSout40) | (SEout) | Rout |
| MOVSAC B | (MULout) | (Bout) | Aout | (ACCout1) | (BSout40) | (SEout) | Rout |
| MPY, SQR, ED A | MULout | Aout | x | Zero | BSout40 | SEout | x |
| MPY, SQR, ED B | MULout | Bout | x | Zero | BSout40 | SEout | x |
| MPYN A | MULout | Aout | x | Zero | BSout40 | SEout | x |
| MPYN B | MULout | Bout | x | Zero | BSout40 | SEout | x |
| SAC, SRAC A | x | Aout | BSout40 | (Zero) | (BSout40) | ACCout1 | Rout |
| SAC, SRAC B | x | Bout | BSout40 | (Zero) | (BSout40) | ACCout1 | Rout |
| SFTAC A | x | Aout | (BSout40) | Zero | BSout40 | ACCout1 | (Rout) |
| SFTAC B | x | Bout | (BSout40) | Zero | BSout40 | ACCout1 | (Rout) |

Note 1: See MLX configuration for barrel shifter
2: Configure Barrel Shifter MLX to load all 0's

| C1 | C0 | Rout | Data Space Write Function |
|---|---|---|---|
| 0 | 0 | Round adder | +ve number, no round overflow and Acc<39:31> = %0000 0000 0 |
| 0 | 1 | Round adder | -ve number, Acc<39:31> = %1111 1111 1 |
| 1 | 0 | 0x7FFF | +ve number and:<br>1. Round overflow (0x7FFF to 0x8000) and/or<br>2. Acc<39:31> != %0000 0000 0 |
| 1 | 1 | 0x8000 | -ve number, Acc<39:31> != %1111 1111 1 |

DSP ENGINE WITH IMPLICIT MIXED SIGN OPERANDS

CROSS-REFERENCE TO RELATED APPLICATIONS

This application claims the benefit of U.S. Provisional Application No. 61/181,468 filed on May 27, 2009, entitled "DIGITAL SIGNAL PROCESSING (DSP) ENGINE WITH IMPLICIT MIXED SIGN OPERANDS", which is incorporated herein in its entirety.

TECHNICAL FIELD

The present application relates to digital signal processor engines of digital signal processors (DSP) and/or central processing units (CPU) of microprocessors or microcontrollers.

BACKGROUND

DSP engines must do mathematical computations quickly. However, compromises are made when it comes to the precision of certain calculations. For example, a 16-bit DSP engine is generally restricted to 16-bit mathematical operations. However, 32-bit operations can be supported by the hardware and may be implemented by respective programming. To this end, for example, many 16-bit DSP engines provide for much larger accumulators, such as 40-bit accumulators, and other hardware that can accommodate higher precision. These hardware structures in combination with a multiplier can be used to perforin higher bit-multiplications such as 32×32-bit multiplications in a 16-bit DSP engine. Nevertheless, such operations can slow down the processing speed significantly, in particular when many high precision multiplications are required. Fast Fourier transformation (FFT) operations, for example, require many such operations and may therefore require substantial processing time. Dedicated 32-bit multipliers require significant amount of chip real estate and thus would increase the cost. Moreover, new instructions would be required to operate such additional hardware.

What is needed is an improved DSP math capability in existing DSP cores without having to change the instruction set and with minimal changes to existing hardware.

SUMMARY

According to an embodiment, a processor may comprise at least one multiplier unit which can be controlled to operate in a signed, an unsigned, or a mixed sign mode; a multiplier unit mode decoder coupled with the multiplier unit which receives location information of a first and second operands, wherein the multiplier mode decoder controls the multiplier unit when in the mixed sign mode depending on the location information to operate in a signed mode, an unsigned mode, or a combined signed/unsigned mode.

According to a further embodiment, the multiplier unit may comprise an n-bit multiplier controllable to perform a signed, an unsigned, or a mixed sign multiplication of two input operands. According to a further embodiment, the multiplier unit may comprise a multiplier data pre-processor coupled to the multiplier unit to independently sign or zero extend the two input operands, and a signed multiplier. According to a further embodiment, the signed multiplier can be an n+1 bit multiplier. According to a further embodiment, the processor may further comprise a control register to select the signed mode, the unsigned mode, or the mixed sign mode in which an automatic selection of signed, unsigned, or combined sign/unsigned multiplication is performed. According to a further embodiment, the location information may comprise whether a register is an odd or an even register from a plurality of working registers. According to a further embodiment, first and second operands can be supplied by a data memory and the location information comprises whether an address is an odd or an even address in memory. According to a further embodiment, the first operand may be selected from a first set of two consecutive registers and the second operand is selected from a second set of two consecutive registers. According to a further embodiment, the processor may further comprise a barrel shifter having a size to accommodate at least the size of a result generated by the multiplier. According to a further embodiment, the processor may further comprise an adder coupled with at least one accumulator and the barrel shifter, wherein the multiplier, accumulator, barrel shifter are part of a digital signal processing (DSP) engine. According to a further embodiment, the processor may further comprise a result extension unit coupled between the multiplier and the barrel shifter and a zero-backfill unit coupled with the result extension unit. According to a further embodiment, the processor may further comprise round logic coupled with the accumulator. According to a further embodiment, the DSP engine can be a 16-bit DSP engine having a plurality of 16-bit registers and wherein the barrel shifter and the accumulator each comprise 40-bit. According to a further embodiment, the processor may further comprise a microcontroller unit wherein at least the multiplier is shared by the microcontroller unit and the DSP to execute arithmetic microcontroller instructions. According to a further embodiment, in signed mode, the multiplier data pre-processor sign extends all input data; in unsigned mode, multiplier data pre-processor zero extends all input data, and in mixed sign mode, the multiplier mode decoder directs the multiplier data pre-processor to sign extend an input if its source is an odd register number or odd memory address, or zero extend an input if its source is an even register number or even memory address.

According to another embodiment, a method for performing a multiplication in a processor may comprise the steps of—providing a first n-bit operand from a first location to a multiplier unit, wherein the multiplier unit can be controlled to operate in signed, unsigned, or a combined sign/unsigned mode;—providing a second operand from a second location to the multiplier unit;—decoding the location for the first and second operand and controlling the multiplier unit to operate in a mixed mode in which a signed, an unsigned, or a combined sign/unsigned multiplication is performed depending on the locations.

According to a further embodiment of the method, the first and second operands can be stored in registers and the location comprises whether a register is an odd or an even register from a plurality of working registers. According to a further embodiment of the method, first and second operands can be supplied by a data memory and the location comprises whether an address is an odd or an even address in memory. According to a further embodiment of the method, the first operand can be selected from a first set of two consecutive registers and the second operand is selected from a second set of two consecutive registers. According to a further embodiment of the method, a control register may determine whether the multiplier unit operates in the a signed, an unsigned, or the mixed mode. According to a further embodiment of the method, the multiplier unit may comprise a signed multiplier and: in signed mode, the first and second operands are sign extended, in unsigned mode, the first and second operands are zero extended, and in mixed sign mode, the first or second operand is sign extended if it is supplied by an odd register number or odd memory address, or zero extended if it is supplied by an even register number or even memory address.

According to yet another embodiment, a method for performing a 2n-bit multiplication using 4 n-bit data words, may comprise the steps of: storing a first operand of the 2n-bit multiplication in a first set of two consecutive registers or two consecutive memory locations; storing a second operand of the 2n-bit multiplication in a second set of two consecutive registers or two consecutive memory addresses; performing a first multiplication by a controllable multiplier unit using a first register or memory address of the first set and a first register or memory address of the second set and shifting an associated first result, performing a second multiplication by the controllable multiplier unit using the first register or memory address of the first set and a second register or memory address of the second set to generate an associated second result, performing a third multiplication by the controllable multiplier unit using the first register or memory address of the second set and a second register or memory address of the first set to generate an associated third result, wherein for each multiplication, the multiplier unit is automatically controlled to operate in signed, unsigned, or a combined sign/unsigned mode depending on the location of the register or address; adding the first, second and third result to generate an end result and storing the end result in registers or memory.

According to a further embodiment of the above method, the location may comprise whether a register is an odd or an even register from a plurality of working registers. According to a further embodiment of the above method, the location may comprise whether an address is an odd or an even address in memory. According to a further embodiment of the above method, a control register determines whether the multiplier operates in signed, unsigned, or a mixed sign mode. According to a further embodiment of the above method, in signed mode, all inputs to a multiplier are sign extended, and in mixed sign mode, an input to the multiplier is sign extended if it is supplied by an odd register number or odd memory address, or zero extended if it is supplied by an even register number or even memory address. According to a further embodiment of the method, the second and third results can be shifted and the method may further comprise the step of performing a fourth multiplication by the controllable multiplier using the second register or memory address of the first set and the second register or memory address of the second set to generate an associated fourth result, and wherein the fourth result is added to the first, second, and third result to generate the end result. According to a further embodiment of the method, a control register may determine whether the multiplier unit operates in signed, unsigned, or a mixed sign mode. According to a further embodiment of the method, the multiplier unit may comprise a signed multiplier and: in signed mode, all inputs to the multiplier are sign extended, in unsigned mode, all input to the multiplier are zero extended, and in mixed sign mode, an input to the multiplier is sign extended if it is supplied by an odd register number or odd memory address, or zero extended if it is supplied by an even register number or even memory address.

BRIEF DESCRIPTION OF THE DRAWINGS

A more complete understanding of the present disclosure and advantages thereof may be acquired by referring to the following description taken in conjunction with the accompanying drawings wherein:

FIG. 5-7 show tables with multiplier operands and result formats;

FIG. 9 is a table showing barrel shifter mode, direction and magnitude control;

FIGS. 10 and 11 are tables showing a barrel shifter mux configuration matrix;

FIG. 12 is a table showing a data accumulator mux configuration matrix;

FIG. 13 is another table showing a data accumulator mux configuration matrix;

FIG. 14 is a table showing overflow and saturation operation examples;

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

DETAILED DESCRIPTION

According to the teachings of this disclosure, a DSP can handle a 32-bit multiplication without dedicated hardware by splitting each 32-bit operand into two 16-bit operands. A plurality of multiplications, shifting and adding must then be performed to accomplish the respective 32 or 64-bit result. The DSP generally has an n-bit multiplier, wherein n<32, for example may comprise a 17-bit multiplier. Such a multiplier is configurable to perform different types of multiplications. Depending on the operands, different types of multiplications may be performed for which the multiplier must be configured. For example, in a multiplication with both operands being signed, the multiplier must be configured differently from an operation in which both operands are unsigned or from an operation in which only one operand is signed. Such a configuration can be accomplished in different ways as will be explained in more detail below.

Figure 3:
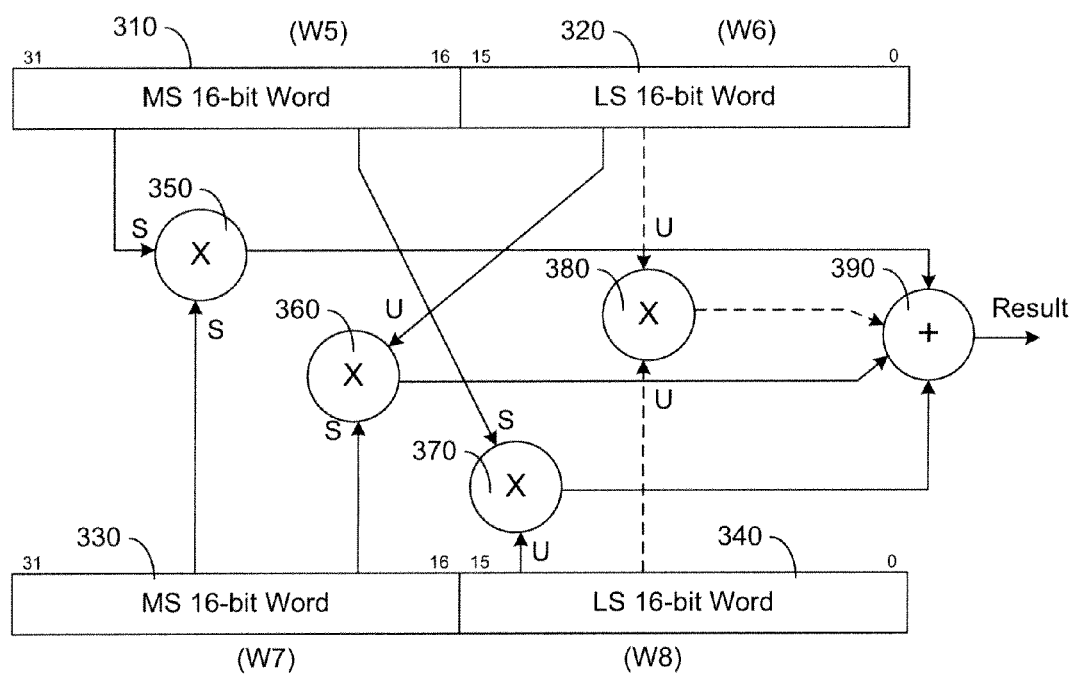
FIG. 3 shows the principal operation of a 32-bit multiplication using a 16-bit multiplier.

FIG. 3 shows a simplified example of a 32-bit multiplication using four 16-bit registers and a 16-bit multiplier operable to perform signed, unsigned, and mixed signed multiplications. As can be seen, to receive a 64-bit result four different types of multiplications are necessary. Operation 350 performs a multiplication in which both operands 310 and 330 are signed because both operands represent the most significant bits (MSB) or upper half of the 32-bit operands. For a 64 bit result, the result of this operation is left shifted by 32 bits before fed to adder 390. For other precisions, the result of this operation may be left shifted by 8, 16 or 24 bits before fed to adder 390 depending on the implementation. Operation 360 multiplies the unsigned 16-bit portion 320 representing the lower half or least significant bits (LSB) of the first 32-bit operand with the signed portion 330 representing the MSB of the second operand. Similarly, operation 370 multiplies the unsigned 16-bit portion 340 representing the lower half or least significant bits (LSB) of the second 32-bit operand with the signed portion 310 representing the MSB of the first operand. Thus, in these two cases an operation with mixed types must be performed wherein one operand is treated as a signed operand and the other as an unsigned operand. For a 64 bit result, the result of operations 360 and 370 is left shifted by 16 bits before fed to adder 390. For other precisions, different shift values apply accordingly. Finally, depending on the precision, the lower halves of both operands 320, 340 representing the LSBs of the two operands must be multiplied by operation 380. The results of each operation is added by operation 390 after the respective results are appropriately shifted to provide for the proper result. Additional shifting may apply to the end result.

To perform the operations 350, 360, 370, and 380, each multiplication may require a reconfiguration of the multiplier or the operands or both. In other words, a separate step for configuring the multiplier or converting the operands is necessary which results in additional steps and therefore lengthens the operation significantly.

According to the teachings of this disclosure, the association of the registers or memory locations representing the 32-bit word can be used to control the operation mode of the multiplier or to control a pre-processor that manipulates the operands as required by the multiplier. According to various embodiments, for a DSP, operands are generally stored in specific registers or memory locations. For example, a DSP engine may use four general purpose registers or four specific memory locations to store operands for a specific operation such as a 2n-bit multiplication. Each combination of registers used to perform the 2n-bit multiplication can automatically trigger a specific operation mode for the multiplier unit. It may be particularly useful if 32-bit load operations are always performed on predefined boundaries in a register file or memory. Thus, for example, in a DSP having four working registers W5, W6, W7, and W8 used for storing operands, a 32-bit word is always stored in an odd register and the following even register, for example, register W5 (310 in FIG. 3) and W6 (320 in FIG. 6). Similarly, when using memory, a 32-bit word may always be stored beginning with an even or an odd address depending on the implementation. Thus, according to this scheme, W5 and W7 (odd registers) or an even memory address will always be regarded as signed values, and operands from W4 and W6 (even registers) or an odd address in memory will always be regarded as unsigned values. Any of these registers or memory locations can be used in performing certain operations of the DSP engine that require a configuration of the multiplier unit.

Thus, a specific configuration register used to configure the operation mode of the multiplier can be used to set the respective mode. For example, the configuration register may include a setting for signed multiplication and one for unsigned multiplication. According to various embodiments, a third mixed mode setting is included that causes an automatic selection depending on the assignment of the registers or the memory address used for the first and second operands. In one case, in which the registers shown in FIG. 3 are assigned as shown in parentheses, an instruction using registers W5 and W7 as first and second operands automatically selects the signed mode. A selection of registers W6 and W8 as first and second operands in an instruction performing a multiplication automatically selects the unsigned mode. A selection of registers W5 and W8 causes a combination of signed and unsigned mode with W5 treated as signed and W8 treated as unsigned and a selection of registers W6 and W7 causes such a mode with W7 treated as signed and W6 treated as unsigned. A similar decoding takes place when memory locations are used. Here an even address may be used to indicate a signed value and an odd address for an unsigned value. Thus, no reconfiguration of the multiplier is necessary and the DSP engine will perform the correct results for the respective steps necessary to perform a 32-bit calculation with a "lower bit" DSP engine.

The various embodiments facilitate execution of signed extended precision algorithms. For example, once the multiplier is configured to automatically set the operand mode, extended precision multiply-accumulate (MAC)-class instructions and cross-multiplies can then be executed sequentially without concern for the operand type.

The following typical DSP instructions may be used with this specifically configurable DSP engine:

TABLE 1

| Instruction | Algebraic Operation |
|---|---|
| ED | $A = (x - y)^2$ |
| EDAC | $A = A + (x - y)^2$ |
| MAC | $A = A + (x*y)$ |
| MPY | $A = x*y$ |
| MPY.N | $A = -x*y$ |
| MSC | $A = A - x*y$ |

However, other instruction may also benefit from the additional operation mode. For example, a combined processor core having DSP functionality and microcontroller or microprocessor functionality may use the same concept also for the non-DSP instructions or for all instructions as will be explained in more detail below. In another embodiment of such a processor, only the DSP instructions may provide for this mechanism whereas any type of microcontroller or microprocessor instruction may require a manual setting.

By adding a mode to the DSP engine that associates specific registers with signed or unsigned data types, registers may be chosen based on 32-bit data alignment. Multiply operation will therefore be inherently signed or unsigned based on source of data. According to one embodiment, four main elements may be used to accomplish a specific example embodiment, according to the teachings of this disclosure.

1) 4×16-bit CPU registers,
2) a 17×17-bit multiplier (could also be a 16×16-bit multiplier with signed/unsign mode control).
3) Multiplier data pre-processor used to sign or zero extend input data, and
4) DSP engine multiplier mode decoder.

According to one embodiment, a DSP engine multiplier mode decoder decodes user control bits to select signed, unsigned or mixed sign operation. In such an embodiment, an n+1 bit multiplier is used which always operates in signed mode. In addition, a pre-processor modifies the incoming operands from n-bit to n+1 bit, wherein the most significant bit is used as the sign. In signed mode, it directs the multiplier data preprocessor to sign-extend all input data (to 17-bits). To sign extend the operand to 17-bits, the MS-bit of the operand is copied into the $17^{th}$ bit. In unsigned mode, it directs the multiplier data pre-processor to zero-extend all input data (to 17-bits). To zero extend the operand to 17-bits, the $17^{th}$ bit is simply set to 0 (i.e. the operand is always viewed by the 17-bit multiplier as a positive value). In a mixed sign mode, it directs the multiplier data pre-processor to sign extend an input if its source is an odd register number or odd/even memory address, or zero extend an input if its source is an even register number or even/odd memory address.

According to one embodiment, 32-bit data is loaded into the CPU registers (or memory) in an aligned manner such that the LS-word is located in an even register (or memory address) and the MS-word is located in an odd register (or memory address). Consequently, in mixed sign mode, the sign of all 16-bit cross multiplies necessary to complete a 32×32 bit multiply will be automatically selected without user intervention, substantially speeding up execution (e.g., by removing the need to be constantly switching DSP engine operating modes).

Figure 1:
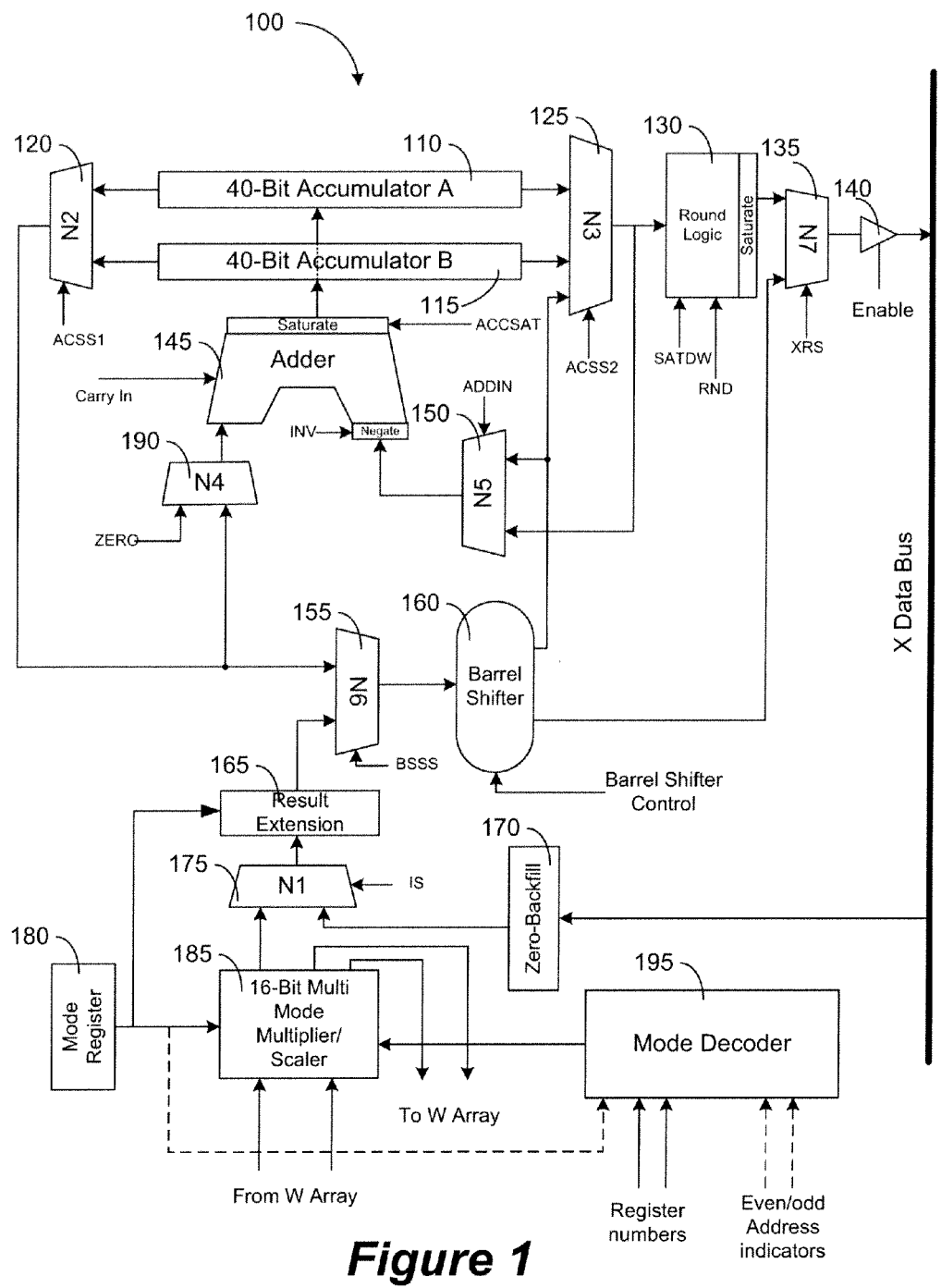
FIG. 1 is a schematic block diagram of a DSP engine according to an embodiment.

FIG. 1 shows an exemplary DSP engine which can be used according to the teachings of this disclosure. Two 40-bit accumulators 110 and 115 are provided. They are coupled through multiplexers 120, 125, 150, 155 and 190 with an adder 145, round logic 130, and barrel shifter 160. A further multiplexer 135 connects the output of round logic 130 and barrel shifter 160 with the X-Data bus. Adder 145 may have the possibility to negate one input and saturate the result as shown in FIG. 1. Barrel shifter 160 may further receive data through multiplexer 155 from a controllable multiplier/scaler unit 185 through a further multiplexer 175 and sign extend unit 165. A zero-backfill unit 170 is provided and couples the X-Data bus with a second input of multiplexer 175. Controllable 16-bit multiplier/scaler unit 185 can be configured through mode register 180 to operate as signed, unsigned or with mixed sign/unsign and receives and transmits data from/to a register array. The output of 16-bit multiplier scaler unit 185 is coupled with the first input of multiplexer 175. Mode decode 195 provides for automatic control of the operation mode of controllable multiplier/scaler unit 185. To this end, mode decoder may receive either the number of the registers representing the first and second operand or the addresses of the memory locations of first and second operands. Alternatively, information whether the address or the register is odd or even can be fed to mode decoder. Mode decoder may use a matrix to switch the configuration mode of multiplier/scaler 185 depending on this information. This automatic mode selection is programmably controlled through mode register 180. If respective bits in mode register 180 are set, multiplier/scaler 185 receives the mode information directly from mode decoder 195. Otherwise, a specific fixed mode (signed/unsigned) is selected through mode register 180. To this end, mode decoder 195 may also receive control signals from mode register 180 as indicated by the dotted line in FIG. 1.

Figure 2:
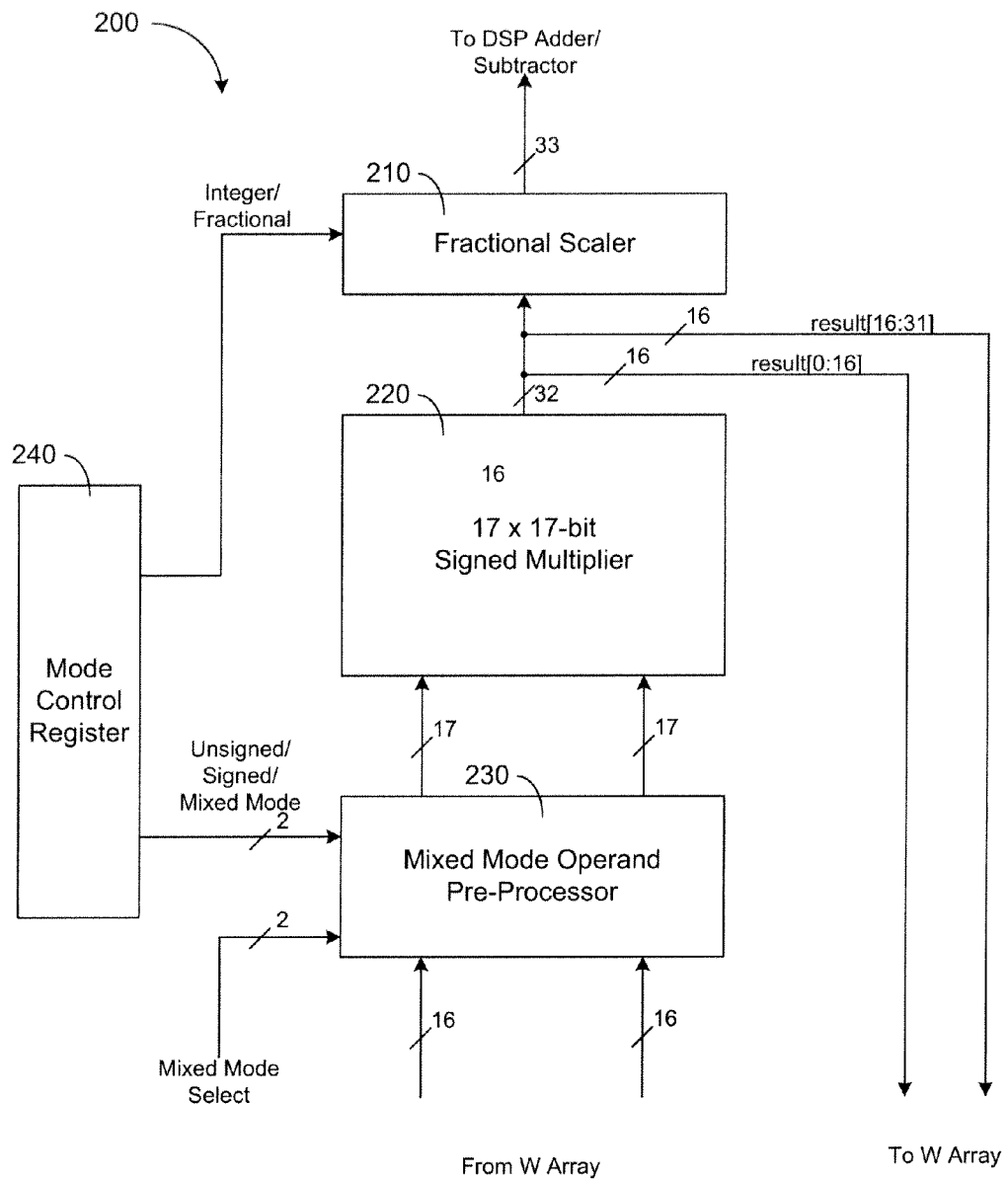
FIG. 2 is a schematic block diagram of a possible implementation of a multiplier/scaler unit.

A different embodiment of the combination of multiplier/scaler unit 185 and mode decoder 195 is shown in FIG. 2. This embodiment may comprise a 17×17-bit signed multiplier 220 that receives two 17-bit input words and outputs a 32-bit result that is fed to a fractional scaler 210 which may shift the result by 1 bit if the operands are fractional operands. To this end, fractional scaler 210 may be controlled by a bit in mode control register 240. Furthermore, a mixed mode operand pre-processor 230 is provided which receives two 16-bit operands from the working registers (or memory) and generates two signed 17-bit operands which are fed to the multiplier 220. Results of the multiplier 220 can be fed back to the register array or memory. Mixed Mode Operand pre-processor 230 always supplies the signed multiplier 220 with signed operands. It converts its input data either static or automatically depending on the location of the incoming data. The term location is to be interpreted as information where the actual data is stored in such a way, that two consecutive storage locations or registers can be distinguished. For example, in two consecutive registers or memory addresses storing two data words one data word is always in an odd and the following in an even location or vice versa. If two words are always stored on the same boundary this information (even/odd) can be used to reliably distinguish between a MS word and a LS word. Here, this information is fed to the mixed mode operand pre-processor as indicated by the mixed mode select signal.

Figure 4:
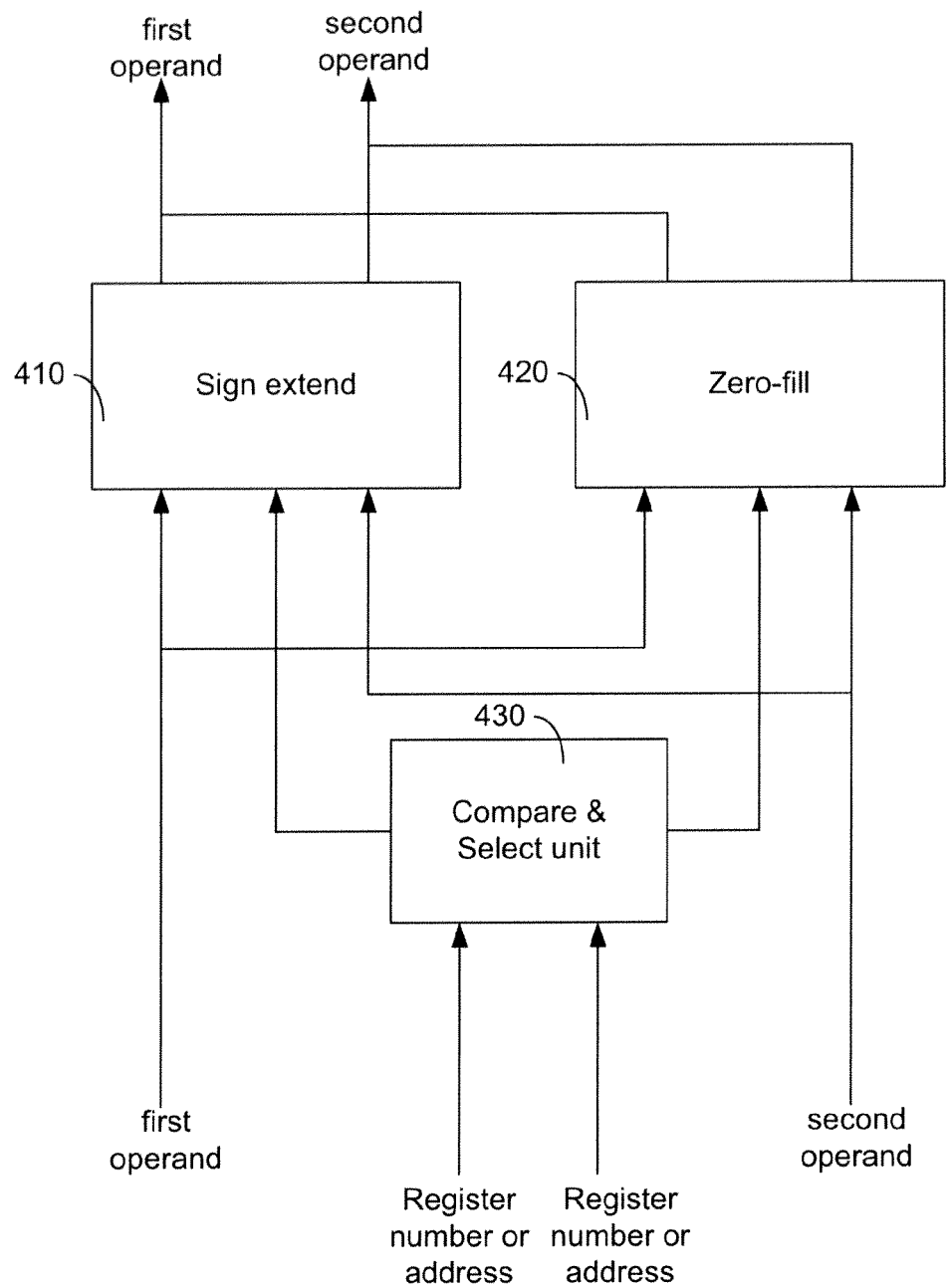
FIG. 4 shows an embodiment of a pre-processor according to FIG. 2.

FIG. 4 shows a possible implementation of a pre-processor as shown in FIG. 2. Here a sign extend unit 410 and a zero-fill unit 420 are provided to perform the operand modifications on first and/or second operand. A compare & select unit determines which unit 410 or 420 is used for the first and second operand. It may receive an address of a register or memory location to determine whether the location is odd or even. Alternatively, this information could be provided directly, for example, by a respective address bit or other means that are operable to forward or generate this information.

The embodiments shown in all figures show a 16-bit DSP with 16-bit registers and a 16-bit or 17-bit multiplier and 40-bit accumulators and barrel shifter. It is to be noted that these values are exemplary. The invention may be applied to any other n-bit processor having a plurality of n-bit registers and a multiplier that cannot directly process operands having a size of 2n.

According to various embodiments, a DSP engine 100 may be combined with a microcontroller unit (MCU) and can be a block of hardware which is fed data from the W register array but contains its own specialized result registers. However, in other embodiments, data may also be fed from memory. The DSP engine 100 can be controlled from the same single issue instruction decoder that directs the MCU arithmetic logic unit (ALU). In addition, all operand effective addresses may be generated in the W register array. Consequently, according to one embodiment, concurrent operation with MCU instruction flow may be not possible, though both the MCU ALU and DSP engine resources may be used concurrently by the same instruction (e.g., ED and EDAC instructions).

The DSP engine may consist of a high speed 17-bit×17-bit multiplier 220, a barrel shifter 160 and a 40-bit adder/subtractor 145 with two target registers 110 and 115, and round and saturation logic 130 as shown in FIG. 2. The DSP engine 100 can be essentially one large asynchronous block, with only the accumulator result registers 110 and 115 being clocked. Data input to the DSP engine 100 may be derived from:

1. Directly from the W array registers:
   for example W4, W5, WB or W7 for the MAC class of Instructions
   Any W register for the MUL.xx class of instructions (that target accumulator A or B)
2. From the X-bus for all other DSP instructions
3. From the X-bus for all MCU instructions which use the barrel shifter 160

Data output from the DSP engine may be written to:
1. The target accumulator 110, 115, as defined by the DSP instruction being executed
2. The X-bus for MAC, MSA, CLRAC and MOVSAC accumulator writes where the EA is W13 register direct or [W13]+=2. Note: MPY(N), SQR{AC}, ED{AC} do not offer an accumulator write option.

3. The X-bus for all MCU instructions which use the barrel shifter 160
4. A 32-bit aligned register pair write bus from the multiplier 220 to the W array to support the MCU multiply Instructions.

The DSP engine also may have the capability to perform inherent accumulator to accumulator operations which require no additional data. These instructions are ADDAB, SUBAB and NEGAB.

The block diagram of the DSP engine 100 as shown in FIG. 1 is conceptual in nature and is only intended for use as an aid to understanding data flow required by the instructions that exercise it. The block diagram of the actual implementation may look significantly different. The different units as shown in FIGS. 1 and 2 and their functionality will be explained below with respect to one or more specific implementations. Other implementations may apply according to respective designs. Therefore, none of the examples and specific embodiments explained below are intended to limit the scope of the present disclosure.

Multiplier

The 17×17-bit multiplier 220 is capable of signed operation and can multiplex its output using a scaler to support either 1.31 fractional or 32-bit integer results. Only 32-bits of the multiplier results may be required. MAC/MSA, MPY{IN}, ED{AC} and SQR{AC} operations are typically signed but the DSP engine may be configured for unsigned or mixed sign operation.

Three control bits (IF and US<1:0>) within the 16-bit CPU Core Control register 240 (CORCON), determine integer/fractional and " unsigned/signed/mixed sign operation respectively for DSP and MCU multiplication instructions that target an accumulator. MCU multiply instructions that target the W array may always considered as integer operations. The scaler 210 shifts the multiplier result one bit to the left for fractional operation only.

Integer/Fractional (IF) Control Bit

According to an embodiment, the state of the CORCON<IF> bit in register 240 controls the operand type for DSP and MCU multiplication instructions that target an accumulator 110 or 115. If CORCON<IF>=0, the multiply operands are considered fixed point 1.15 fractional values. If CORCON<IF>=1, the multiply operands are considered integer values.

The assumption is that If MCU instructions are targeting an accumulator 110, 115, they are being used in conjunction with the DSP instructions so should inherit the same operand type. If this is not the case, a user must manually manipulate the CORCON<IF> bit accordingly.

Signed/Unsigned Control Bit

If CORCON<US[1:0]>=2'b00, in the MAC/MSA, MPY{N}, ED{AC} and SQR {AC} instructions, both operands are considered as signed values which are subsequently always sign extended into the 17th bit of the multiplier input value. The result is also sign extended prior to any operation with the accumulator (which will always effectively be signed).

If CORCON<US[1:0]>=2'b01, in the MACIMSA, MPY{N}, ED{AC} and SQR{AC} instructions, both operands are considered as unsigned values which are subsequently always zero extended into the 17th bit of the multiplier input value. The result is also zero extended prior to any operation with the accumulator (which will always effectively be signed).

If CORCON<US[1:0]>=2'blx, in the MACIMSA, MPY{N}, ED{AC} and SQR{AC} operands are considered as signed or unsigned values depending upon the W register source. If the W register source is odd (W5 or W7), the operand is assumed to be signed. If the W register source is even, the operand is assumed to be unsigned. The result is sign extended if one or both of the operands are signed, otherwise it is zero extended prior to any operation with the accumulator (which will always effectively be signed).

According to one embodiment, the CORCON<US[1:0]> bits do not influence the MCU multiply instructions which determine their own signed or unsigned mode of operation.

MCU Multiply Instructions

The same multiplier may be used to support the MCU multiply instructions which Include integer 16-bit signed, unsigned and mixed sign multiplies. Additional data paths are provided to allow these instructions to write the result back into the W array and X data bus (via the W array) as shown in FIG. 2. These paths are placed prior to the data scaler 210. In addition, these instructions may also target accumulators 110 and 115. These paths are placed after the data scaler 210 because the operands may be fractional (CORCON<IF>=0). That is, the results will be scaled as usual, based on the state of the IF bit. All MCU multiply operations explicitly identify sign or unsigned operation. The MCU multiply instructions may write either the full 32-bit result into an even aligned W register pair, or only the LS 16-bits of the result into a single (even) W register based upon the instruction destination field encoding.

According to some embodiments, for 32-bit results, the destination register pair for MCU multiplies may be 'aligned' (i.e, odd:even), where 'odd' contains the MS result word and 'even' contains the LS result word. For example, in such embodiments W3:W2 is acceptable, whereas W4:W3 is not and may be flagged by the assembler as an error. Similarly, for 16-bit results, the destination register may be an even value. For example, W6 is acceptable, whereas W7 is not and may be flagged by the assembler.

According to an embodiment, an unsigned multiply instruction may be directed to use byte or word sized operands. The destination may always be the W3:W2 register pair in the W array. Byte operands will direct a 16-bit result to W2 (W3 not changed), and word operands will direct a 32-bit result to W3:W2.

Simple data preprocessing logic as for example shown in FIG. 4 either zero or sign extends ail operands to 17-bits such that unsigned, signed or mixed sign multiplications can be executed as signed values.

According to an embodiment, all unsigned operands may always be zero extended into the 17th bit of the multiplier input value. All signed operands may always be sign extended into the 17th bit of the multiplier input value. According to an embodiment, for signed 16-bit multiplies, the multiplier 2200 produces 30 bits of data and 2 bits of sign, which are fed into the scaler 210. If the instruction is operating in integer mode, the result is not modified and passes out of the multiplier block as a 32-bit signed number. If the instruction is operating in fractional mode (DSP ops and MCU multiply ops that target a DSP accumulator when CORCON<IF>=0), the result is shifted one bit to the left (i.e. it has 1 bit of sign remaining). For fractional multiplies, bit 0 of the result is always 0. For 16-bit mixed mode (signed/unsigned) multiplies, the multiplier produces 31 bits of data and 1 bit of sign. For unsigned 16-bit multiplies, the multiplier produces a 32-bit unsigned result.

FIGS. 5 to 7 show detailed tables of how operands are handled for each multiply type and the corresponding result format generated. For the MCU multiplication instructions that target just a single (even) W register, the LS-word of the result, R<15:0>, is written to the target register. The remaining MS-bits are discarded.

Barrel Shifter

Figure 8:
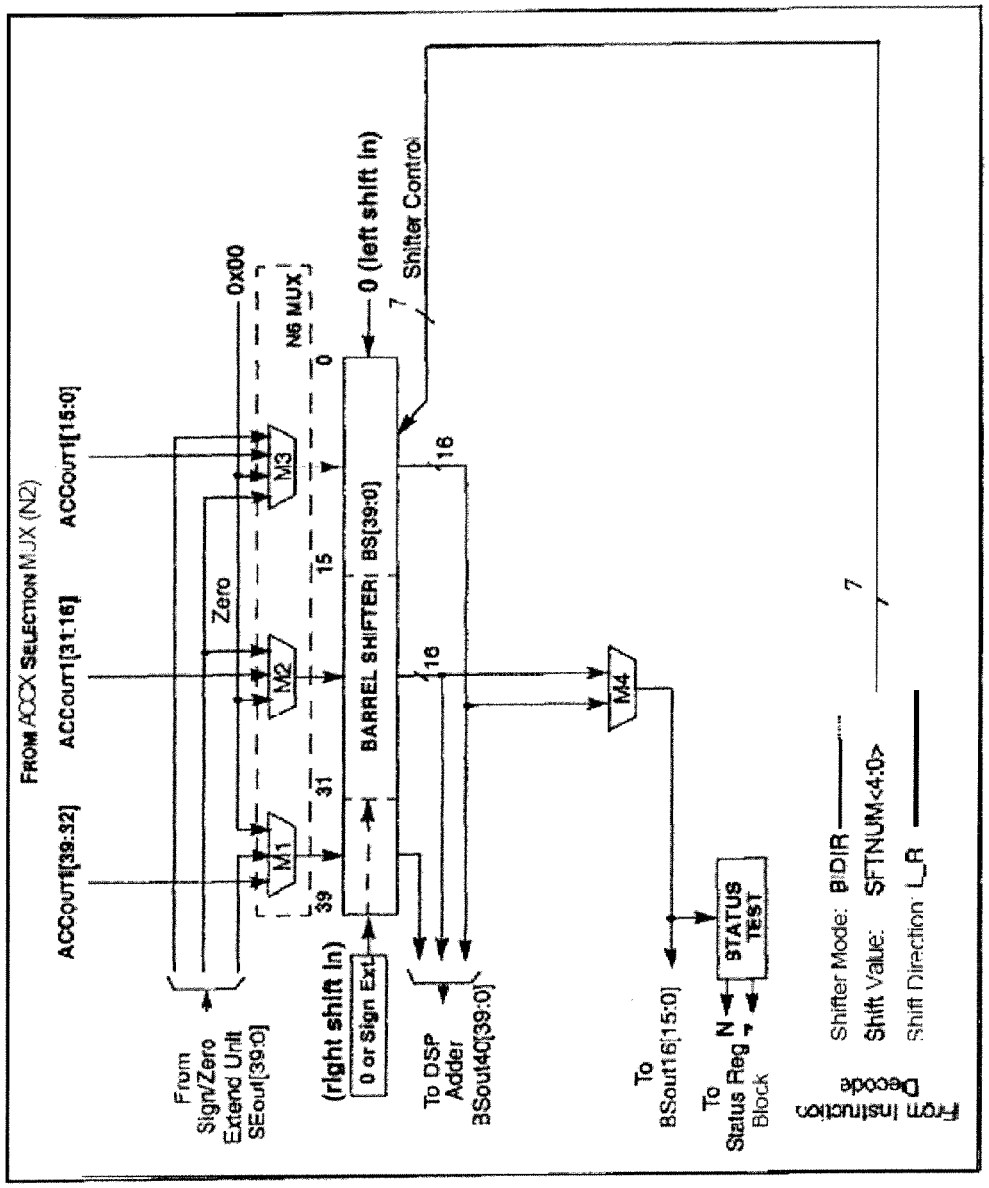
FIG. 8 shows an embodiment of a barrel shifter in a block diagram.

FIG. 8 shows a block diagram of the 40-bit barrel shifter 160 which may be capable of performing up to an 16-bit arithmetic right shift or up to a 16-bit left shift in a single cycle. The source can be either of the two DSP accumulators 110, 115 or the X-bus (to support multi-bit shifts of register or memory data). The shifter 160 may be a custom design that features 2 modes of operation to support the differing requirements for DSP and MCU multi-bit shift instructions. The operating mode is controlled by the BIDIR signal.

In a first mode which may be used by all MCU shift instructions (i.e., all shift Instructions other than SFTAC and SFTACK), the barrel shifter 160 accepts a 5-bit shift magnitude value, SFTNUM<4:0>, and a direction signal, L_R. When L_R=0, the shifter 160 will shift the input operand left by the number of bits defined by SFTNUM<4:0>. When L_R=1, the shifter 160 will shift the input operand right by the number of bits defined by SFTNUM<4:0>. FIG. 9 shows a table with the direction and magnitude control as well as the shift range depending on the control signals.

There are 2 classes of MCU multi-bit shift instructions, one with constant shift value and the other with a variable shift value. The constant shift instructions (ASRK, LSRK, SLK) contains a 4-bit shift magnitude literal field which restricts the shift range to lie between 0 and 15. The variable shift instructions (ASRW, LSRW, SLW) use a W register as the source of the shift magnitude. The shift operation is to be organized such that the shift result will be correct for all values. Because shifting a 16-bit data value by more than 15-bits is equivalent of either clearing it or setting it (for ASRW when the MS-bit of the original operand was set), the useful shift range remains between 0 and 15.

In a second mode, which may be used by the remaining other DSP-shift instructions SFTAC and SFTACK which operate only on the 40-bit DSP accumulators, the shifter is directed by a 6-bit 2's complement signed shift value that represents the magnitude and direction of the shift operation. The shift direction and sign are consistent with that required for data normalization.

In this mode, the L_R signal becomes the sign bit (and consequently still represent shift direction) and SFTNUM<4:0> is the LS 5-bits of the shift value, and represents the shift magnitude. For positive (L_R=0, right shift) values, the shifter will shift the target accumulator right by the number of bits defined by SFTNUM<4:0> from 0 to a maximum of 16. For negative (L-R-1, left shift) values, the shifter will shift the target accumulator left by the 2's complement of the number of bits defined by SFTNUM<4:0> from 0 to a maximum of 16. Again FIG. 9 shows a table with the direction and magnitude control as well as the shift range depending on the control signals.

In this mode, there are 2 classes of DSP multi-bit shift Instructions, one with constant shift value (SFTACK) and the other with a variable shift value (SFTAC). The assembler will trap attempts to use SFTACK instruction with a shift value greater than 16 or less than −16. For the SFTAC instruction, the maximum shift magnitude is restricted by hardware to a shift value of greater than 16 or less than −16. An attempt to execute a SFTAC instruction with a shift value outside the valid range will cause an math error trap to be taken. Should this occur, the result of the attempted shift will not be written to the target accumulator. An attempt to execute a SFTACK Instruction with a shift value outside the valid range (e.g. by manually manipulating the instruction literal field) will not be trapped. The instruction will execute but may not produce the correct result. The SFTAC range is restricted because the target DSP accumulator is 40-bits wide, so a shift value greater than 16-bits could produce a meaningful result (i.e. it may not be zero or all 1's, as would be the case for the MCU multi-bit shift ops). That is, the MCU variable multi-bit shift Instructions can accept any shift magnitude and still get the correct result but this is not the case with an SFTAC instruction without extending the range of the shifter 160.

Furthermore, it is possible to shift a signed value in the accumulator such that the sign is destroyed (catastrophic overflow). If the barrel shifter result is then passed through the saturation logic as normal, it would produce an incorrect saturated result based on the new sign. However, the shifter 160 includes logic to examine bits shifted left beyond bit 39 such that a catastrophic overflow is recognized and saturation is accurately applied based on the sign of the original data value. For example:

```
;       Assume Q31 saturation enabled
;       and AccA = 0x0078AA0000
;           SFTAC A, #9
;       Ox007FFFFFPF->AccA, SA=1
;       AccAii9 = OxP554000000 but bit39 overflow detected so set SA
and saturate to maximal positive (original AccA[39]=0) Q31 value.
```

The multi-bit MCU shift instructions ASRK, LSRK and SLK provide an unsigned 4-bit shift value from an instruction literal field. The instructions zero extend this value to 5-bits to become SFTNUM<5:0>. The instruction shift direction determines L-R. The shifter mode signal, BIDIR, is cleared for these Instructions. The multi-bit MCU shift Instructions ASRW, LSRW and SLW extract the unsigned 4-bit shift value from the LS 4-bits of a W register, Wb. The instructions zero extend this value to 5-bits to become SFTNUM<5:0>. The instruction shift direction determines L-R. The shifter mode signal, BIDIR, is cleared for these instructions. Should any of the remaining MS 12-bits of Wb be set (Indicating that the shift value is greater than 15), then the shift result is forced to be zero or all 1's (for ASRW when the MS-bit of the original operand was set).

The multi-bit DSP shift instruction SFTACK provides a 2's complement signed 6-blt shift value from an instruction literal field. The MS-bit of this value is assigned to L-R and the remaining 5-bits to SFTNUM<4:0>. The shifter mode signal, BIDIR, is set for this instruction. Shift values outside the valid range are not trapped In hardware because they will be detected by the assembler.

The multi-bit DSP shift instruction SFTAC extracts the signed 6-bii shift value from the LS 6-bits of a W register, Wn. The MS-bit of this value is assigned to L_R and the remaining 5-bits to SFTNUM<4:0>. The shifter mode signal, BIDIR, is set for this instruction. To prevent attempts to shift beyond the maximum range of the barrel shifter, Wn is checked to confirm that the shift value is valid. Should the shift value be greater than 16 or less than −16, an math error trap will be generated and the shift result will not be written to the of target accumulator.

The barrel shifter 160 is 40-bits wide to accommodate the width of the accumulators. It is used for both DSP and MCU shift operations. Result data is taken from BSout40 for DSP shift operations, and from BSout16 for MCU shift operations.

Data Is routed to and from the barrel shifter through a series of multiplexers which configure the data path such that the MCU shifts can be achieved. The multiplexers to achieve this data selection are named M1 through M4. FIG. 10 shows a table how the multiplexers are configured for each DSP engine instruction. FIG. 11 shows an alternative mapping where instructions have been grouped into common control blocks to demonstrate decoding efficiency potential. Where possible, 'don't care' states have been used to condense the decode requirements. Redundant signals are shown bracketed.

Data Input to the barrel shifter is controlled by multiplexers M1, M2 & M3 (combined and shown as mux N6 in FIG. 8) and can be one of the following sources:
1. An accumulator
2. The output of the multiplier sign extension unit
3. Zero Data from the X-bus is presented to the barrel shifter between bit positions 16 to 31 for right shifts, and bit positions 0 to 15 for left shifts. Full range (16-bits left through 15-bits right) operation is therefore available for all multi-bit arithmetic or logical shift operations on data memory or registers.

The Data Accumulators and Adder/Subtractor

The data accumulator block 100 comprises a 40-bit adder/subtractor 145 with automatic result (zero or sign) extension logic for the multiplier result. It can select one of two accumulators 110, 115 (A or B) as its pre-accumulation source and post-accumulation destination. For the ADDAC and LAC instructions, the data to be accumulated or loaded can be optionally be scaled via the barrel shifter 160 prior to accumulation as shown in FIG. 1.

The data accumulator block 100 shown in FIG. 1 is conceptual in nature and is only intended for use as an aid to understanding data flow required by the instructions that exercise it, The block diagram of an actual implementation may look significantly different.

Figure 12:
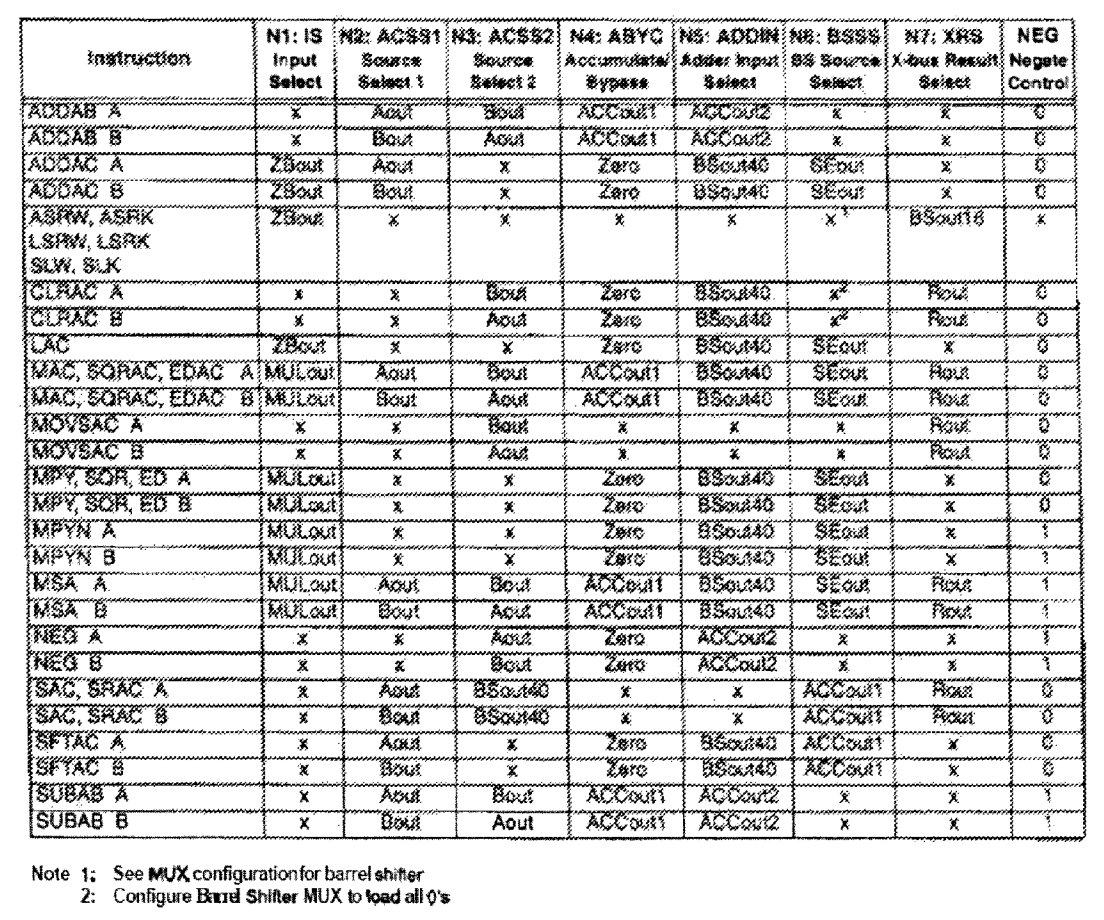

There are several data path selection and function control signals which are mapped in the table shown in FIG. 12 for each of the DSP instructions. An alternative mapping is shown in FIG. 13 where instructions have been into common control blocks to demonstrate decoding efficiency potential. Where possible, 'don't care' states have been used to condense the decode requirements (the negate control signal is ignored for this exercise). Redundant signals are shown bracketed.

Result Extension Block

The result extension block 165 sign extends the 32-bit number presented to it to 40-bits when the DSP engine is operating in signed mode (US=1). When operating in unsigned mode (USO), the result extension block 165 zero extends the 32-bit number presented to it to 40-bits. According to an embodiment, the barrel shifter 160 will also need to be capable of forcing result zero extension. This may be however attained in a variety of ways.

Zero Back-fill

To simplify the system description, the zero back-fill block 170 is shown to always concatenate 16 least significant zero's onto the word read from the X-bus. The barrel shifter 160 is also shown to have the same ability. This is again a design implementation and may be attained in a variety of ways.

Adder/Subtractor, Overflow & Saturation

The adder/subtractor 145 is a 40-bit adder with an optional zero input into one side and either true or complement data into the other input. In addition, the adder 145 may receive a carry in signal which can be either high or low, it must generate two overflow status bits which are latched and routed to the Status Register control block.

An overflow into bit 39 can be used as a catastrophic overflow in which the sign of the accumulator is destroyed. An overflow into bits 31 through 39 can be used as a recovery overflow. This bit is set whenever all of these bits are not the same. It indicates that the data value written to the accumulator 110, 115 can no longer be represented as a 1.31 fractional value.

The adder 145 has an additional saturate block which controls accumulator data saturation if selected. It uses the adder result, overflow status bits described above, and the SATNB and ACCSAT mode control bits to determine when to saturate and to what value to saturate. The adder/subtractor 145 and saturation blocks are henceforth referred to as the DSP AU (arithmetic unit). According to an embodiment. although the OA, OB, SA and SB status bits (and associated saturation action) have no meaning when operating the DSP engine in unsigned mode (US=1), they are not inhibited, if enabled, saturation will occur based on the same rules irrespective of the signed/unsigned operating mode of the DSP engine 100.

Six Status Register bits may be added to support saturation and overflow. They are:
1. OA: AccA fractional overflow into guard bits (can no longer be represented as a 1.31 fractional value)
OB: AccB fractional overflow into guard bits (can no longer be represented as a 1.31 fractional value)

The OA and OB can be R/W bits within the CORCON mode operation register 180.

2. SA: a) Normal Saturation enabled: SA set if AccA overflowed into guard bits. AccA will be saturated to a 1.31 value.
   b) Super Saturation enabled: SA set it AccA overflowed into sign (AccA<39>). AccA will be saturated to a 9.31 value.
   c) Saturation disabled: SA set it AccA overflowed into sign (AccA<39>). AccA will contain (overflowed) result of operation. If COVTE is set, an arithmetic error trap will occur. The trap handler may then take appropriate action to deal with the catastrophic overflow.

SA again can be a R/W bit within the CORCON register 180.

3. SB: a) Normal Saturation enabled: SB set if AccB overflowed into guard bits. AccB will be saturated to a 1.31 value.
   b) Super Saturation enabled: SB set it AccB overflowed into sign (AccB<39>). AccB will be saturated to a 9.31 value.
   c) Saturation disabled: SB set it AccB overflowed into sign (AccS<39>). AccB will contain (overflowed) result of operation. If COVTE is set, an arithmetic error trap will occur. The trap handler may then take appropriate action to deal with the catastrophic overflow.

SB may be again a R/W bit within the CORCON register 180.

4. OAB: Logical OR of OA and OB
5. SAB: Logical OR of SA and SB

When operating in Normal Saturation mode (1.31), bit 31 is the sign bit of the 1.31 fraction. The remaining bits in the accumulator have no real function and will always be sign extended from bit 31. OA/OB will never be set. When operating in Super Saturation (or no saturation), bit 31 becomes one of the guard bits which all together provide the integer portion of the 40-bit signed fractional value. The guard bits ate therefore bits 31 through bit 38, and bit 39 is now designated the sign bit. Fractional overflow is detected whenever all of the guard bits and the sign bit (i.e. bits 39 through 31) are not equal.

The OA and OB bits are modified each time data passes through the DSP AU. When set, they indicate that the most recent operation has overflowed into the accumulator guard bits. The OA and OB bits can also optionally generate an math error trap when set and the corresponding overflow trap flag enable bit (OVATE, OVBTE) in the INTCON1 register is set. This allows the user to take immediate action, for example, to correct system gain.

OA/OB are updated based on the data value at the DSP AU output (i.e. post saturation, if any). Consequently, OA/OB will never be set if Q31 saturation mode is selected, even if the adder indicated that an overflow had occurred (bits 31 through 39 will always be the same).

OA/OB are only updated following a DSP AU operation. All DSP instructions pass data through the DSP AU (and will update OA/OB) but a write to the accumulator SFRs will not pass through the DSP engine and will therefore not update OA/OB.

The SA and SB bits can be set each time data passes through the DSP AU but can only be cleared by the user or CLRAC instruction (i.e. they are 'sticky' in nature). When set they indicate that the accumulator has overflowed its maximum range (bit 31 for 32-bit saturation or bit 39 for 40-bit saturation) and will be saturated (If saturation is enabled). When saturation is not enabled, the SA and SB default to bit 39 overflow and thus indicate that a catastrophic overflow has occurred. If the COVTE bit in the INTCON1 register is set, SA and SB bits will generate an math error trap when saturation is disabled.

The SA and SB status bits are 'sticky'. Once set they cannot be cleared by the saturation logic (only by the user code, for example, CLRAC), irrespective of the results from any subsequent accumulator based operations. However, the accumulator contents themselves are not 'sticky'. This means that all subsequent operations continue to accumulate new results whether the accumulator has been previously saturated or not. This may result in continued saturation (e.g., the accumulator is saturated to the maximum positive value and a new accumulation attempts to add to this value) or may cause the accumulator contents to change (e.g., the accumulator is saturated to the maximum positive value and a new accumulation attempts to subtract from this value which will reduce the accumulator contents by this value).

The OA and OB bits are not 'sticky' and are based on evaluation of each accumulator based operation.

The overflow and saturation status bits can optionally be viewed in the status register as the logical OR of OA and OB (in bit OAB) and the logical OR of SA and SB (in bit SAB). This allows programmers to check one bit in the Status Register to determine if either accumulator has overflowed, or one bit to determine if either accumulator has saturated.

SAB and OAB are not latched or 'sticky'. They will read as a one whenever either OA or OB (for OAB), or SA or SB (for SAB) are set. They will be read as zero whenever both the associated bits are dear. However, the 'sticky' attributes of SA and SB wilt make SAB appear 'sticky' even though it is not, OAB is a read only bit.

SAB may be written to a zero as a means to provide a signal to clear both SA and SB simultaneously. The clear operation does not clear a latch, but does clear SA and SB which In turn will cause SAB to be read as clear during the next read. The device supports three saturation and overflow modes.

1. Bit 39 Overflow and Saturation: Using the bit 39 overflow status bit from the adder, and the bit 39 value after the addition, the correct sign of the 9.31 result can be determined. The saturate logic then loads the maximally positive 9.31 (0x7FFFFFFFFF) or maximally negative 9.31 value (0x8000000000) into the target accumulator. The SA or SB bit is set and remains set until cleared by the user. This is referred to as 'super saturation' and provides protection against erroneous data or unexpected algorithm problems (e.g. gain calculations).

2. Bit 31 Overflow and Saturation: Using the bit 31 to 39 overflow status bit from the adder, and the bit 39 value after the addition, the correct sign of the required 7.31 result can be determined. The saturate logic then loads the maximally positive 1.31 value (0x007FFFFFFF) or maximally negative 1.31 value (0xFF80000000) into the target accumulator. The SA or SB bit is set and remains set until cleared by the user. When this saturation mode is in effect, the guard bits are not used (so the OA, OB or OAB bits are never set).

3. Bit 39 Catastrophic Overflow: The bit 39 overflow status bit from the adder is used to set the SA or SB bit which remain set until cleared by the user. No saturation operation is performed and the accumulator is allowed to overflow (destroying its sign). If the COVIE bit in the INTCON1 register is set, a catastrophic overflow can initiate a trap exception.

Figure 14:
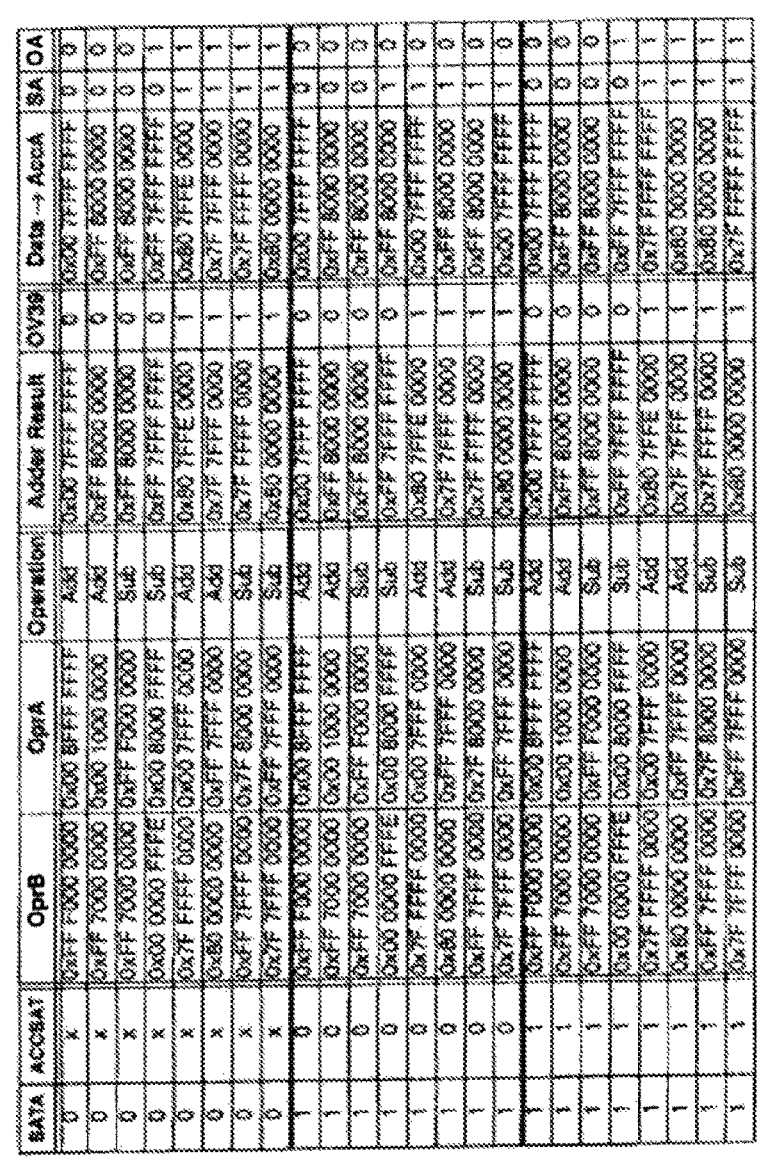
Figure 15:
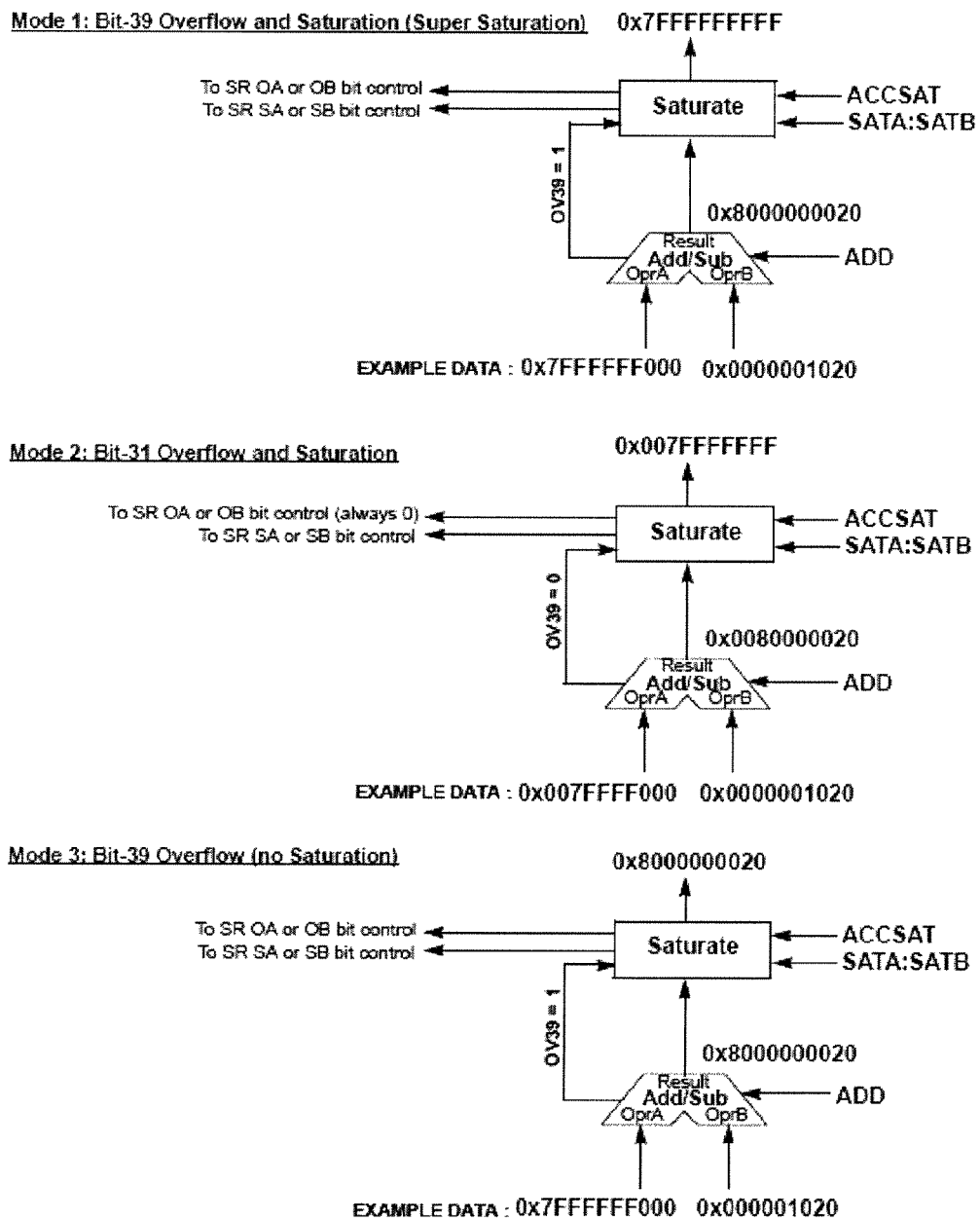
FIG. 15 is a table showing saturation and overflow modes.

Saturation and overflow operation for all adder/subtractor modes is summarized in FIG. 14 for Acc A (same logic applies to AccB). Some examples are also shown in FIG. 15. According to an embodiment, the subtraction operation is OprB-OprA. The boolean equation for OV39 is as follows:

$$OV39\text{(for add operations)} =$$
$$(OprA<39> \&\& OprB<39> \&\& AccA<39>)$$
$$\|(\overline{OprA<39>} \&\& \overline{OprB<39>} \&\& \overline{AccA<39>})$$
$$OV39\text{(for subtract operations)} =$$
$$(OprB<39> \&\& \overline{OprA<39>} \&\& \overline{Result<39>})$$
$$\|(\overline{OprB<39>} \&\& OprA<39> \&\& Result<39>)$$

Accumulator 'Write-Back' (AWB)

Some of the MAC class of instructions (the exceptions are MPY, MPYN, ED, EDAC, SQR and SQWC) can optionally write a rounded version of the accumulator (which Is not targeted by the instruction) into data space memory. The write is performed across the Xbus into combined X and Y address space. Limited instruction decode space has limited the addressing mode options, plus forces the data to be always rounded and not scaled. However, this feature has been found to be beneficial in FFT and LMS algorithms amongst others.

The following addressing modes are supported.

1. W13, register direct: The founded contents of the non-target accumulator are written into W 13 as a 1.I 5 fraction.

2. [W13++], register indirect with post increment: The rounded contents of the non-target accumulator are written into the address pointed to by W13 as a 1.15 fraction. W13 is then incremented by 2 (for a word write).

According to an embodiment, an AWB operation does not modify the contents of the source accumulator, nor does it update OA/OB or SA/SB (even if the resultant data overflows and/or is saturated.

Round Logic

Figures 16, 17:
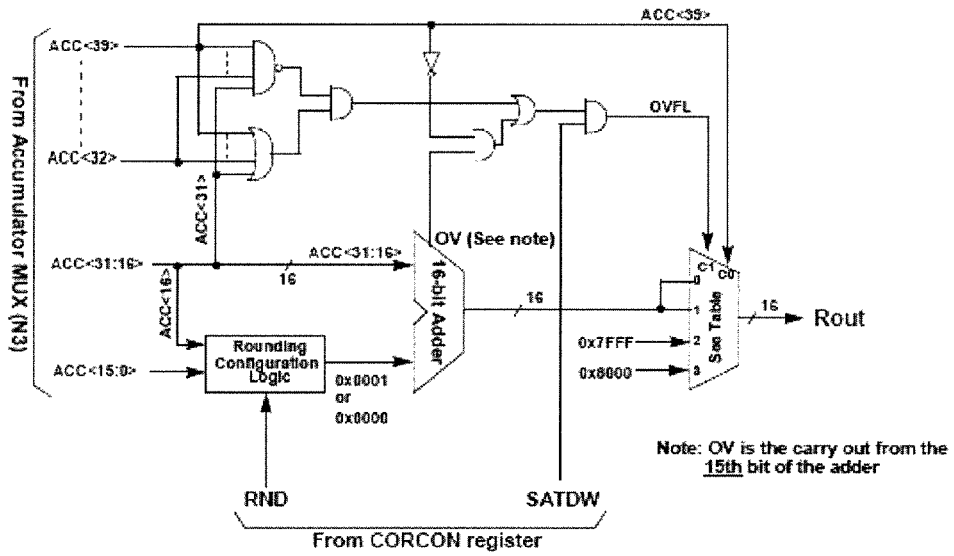
FIG. 16 is a round & data bus saturation logic block diagram.
FIG. 17 is a table showing round mux encoding and function.

The round logic is a combinational block which performs a conventional (biased) or convergent (unbiased) round function during an accumulator write (store), The round mode is determined by the state of the RND bit in the CORCON register 180. It generates a 16 bit 1.15 data value which is passed to the data space write saturation logic as shown in FIG. 16. If rounding is not indicated by the instruction, a truncated 1.15 data value is stored.

According to an embodiment, the rounding function only requires a 16-bit adder. The MCU ALU is available for all instructions other than ED & EDAC and could, therefore, be used to perform the rounding addition to save area. This may depend upon proximity to the DSP engine etc.

Figure 18:
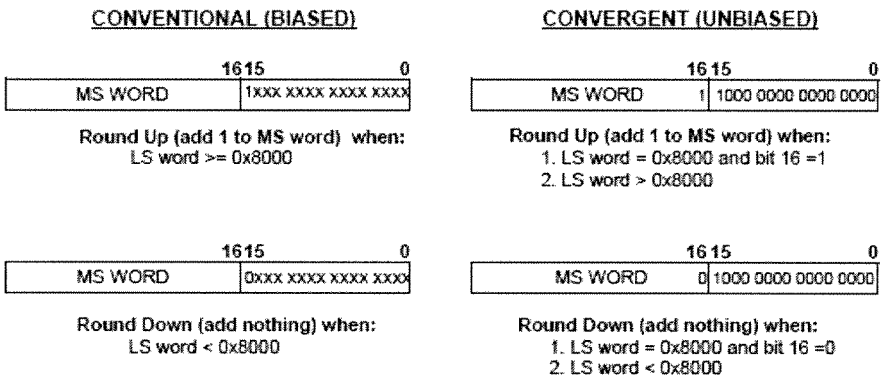
FIG. 18 is a table showing conventional and convergent rounding modes.

The two rounding modes are shown in FIG. 18. Conventional rounding takes bit 15 of the accumulator, zero extends it and adds it to the MS word excluding the guard or overflow bits (bits 16 through 31). If the LS word of the accumulator is between 0x8000 and 0xFFFF, the MS word is incremented. If the LS word of the accumulator is between 0x0000 and 0x7FFF, the MS word is left unchanged. A consequence of this algorithm is that over a succession of random rounding operations, the value will tend to be biased slightly positive.

Convergent (or unbiased) rounding operates in the same manner as conventional rounding except when the LS word equals 0x8000. If this is the case, the LS bit of the MS word (bit 16 of the accumulator) is examined. If it is 1, the MS-word is incremented. If it is 0, the MS-word is not modified. Assuming that bit 16 is effectively random in nature, then this scheme will remove any rounding bias that may accumulate.

The SAC and SACR instructions store either a truncated (SAC) or rounded (SACR) version of the contents of the target accumulator to data memory via the X-bus (subject to data saturation.

According to an embodiment, the MAC class of instructions, the accumulator write operation will function in the same manner, addressing combined MCU (X and Y) data space though the X-bus (i.e. X and Y data spaces are only separated during the data read portion of the cycle, Q1, Q2). For this class of instruction, the data is always subject to rounding (mode determined by the RND bit).

Data Space Write Saturation

In addition to DSP AU saturation, writes to data space may also be saturated but without effecting the contents of the source accumulator. The data space write saturation logic block routes the 16-bit 1.15 fractional value from the source accumulator to the round adder. The remaining MS bits of the source accumulator are used to generate an overflow status of the accumulator. These are combined and used to select the appropriate 1.15 fractional value as output to write to data space memory as shown in FIGS. 16 and 17.

According to an embodiment, the overflow logic is independent from the DSP AU overflow logic. Consequently, the contents of the source accumulator will always be saturated correctly, irrespective of the how the data was placed in the accumulator (i.e. via the DSP AU or an SFR write).

If the SATDW bit in the CORCON register 180 is set (the default state), data (after rounding or truncation) is tested for overflow and adjusted accordingly. For input data greater than 0x007FFF, data written to memory is forced to the maximum positive 1.15 value, 0x7FFF. For input data less than 0xFF8000, data written to memory is forced to the maximum negative 1.15 value, 0x8000. The MS-bit of the source (bit 39) is used to determine the sign of the operand being tested.

A rounding overflow (OV) may be defined to be when there is a carry from bit 15 to bit 16 of the round adder.

Because the rounding schemes used here are, by definition, unidirectional (i.6, add 1 or 0), the only overflow allowable Is from 0x7FFF to 0x8000. Consequently, the overflow that would be detected from a round-up of 0xFFFF must be prevented. The suggested implementation is shown in FIG. 16 is such that no negative (pre-round) value will result in data space saturation to 0x8000 unless the original guard bits (ACC<39:31>) are not equal to %1111 1111 1.

If the SATDW bit in the CORCON register 180 is not set, the input data is always passed through unmodified under all conditions. All data writes from the DSP engine into data space may be optionally saturated.

Power Conservation

As mentioned previously, the DSP engine 100 may be essentially one large asynchronous block of logic with only the accumulator registers being clocked. Consequently, there are multiple paths which could end up being fed with data when they do not need to be, potentially consuming more power than necessary. Some suggested data path blocks have been indicated on the block diagram to emphasize this point, however, the final location of these elements will depend on the structural implementation chosen for the final design.

DSP Engine Mode Selection

The DSP engine has various modes of operation selected through the CPU Core Configuration Register, CORCON 180 or Interrupt Configuration Register, INTCON1. Operating modes are:

1. Fractional or integer
2. Signed or unsigned
3. Conventional or convergent rounding
4. Automatic saturation on/off for AccA
5. Automatic saturation on/off for AccB
6. Automatic saturation on/off for writes to data memory
7. Accumulator saturation mode selection
8. Trap on overflow on/off of AccA
9. Trap on overflow on/off of AccB
10. Trap on catastrophic overflow on/off of AccA and/or AccB DSP Instructions There are 3 broad classes of instructions.
1. No operand (Inherent) with scaling
2. Single operand with scaling
3. Dual operand without scaling In addition to instructions to enhance DSP performance, the following hardware features may be included.

a. 'REPEAT n' instruction which will lock the following instruction into the instruction register then execute it 'n' times.

b. Nested 'DO' loop hardware program loop control with visible control registers for nesting support c. "Find First" Instructions to determine the first bit set or cleared starting from the LS or MS bit.

d. Modulo addressing mode associated with any working (address) registers e. Bit reverse addressing mode for X data space writes only "Find First" Instructions There are 3 variations of 'find first' instructions:

1. FF1L: Find the first occurrence of a 1 starting from the left. This instruction may be useful for RTOS task management and other bit polling applications.

2. FF1R: Find the first occurrence of a 1 starting from the right. This Instruction may be useful for RTOS task management and other bit polling applications.

3. FBCL: Find the first occurrence of the complement of the MS-bit (sign) starting from the left. This instruction is useful for data normalization.

Figure 19:
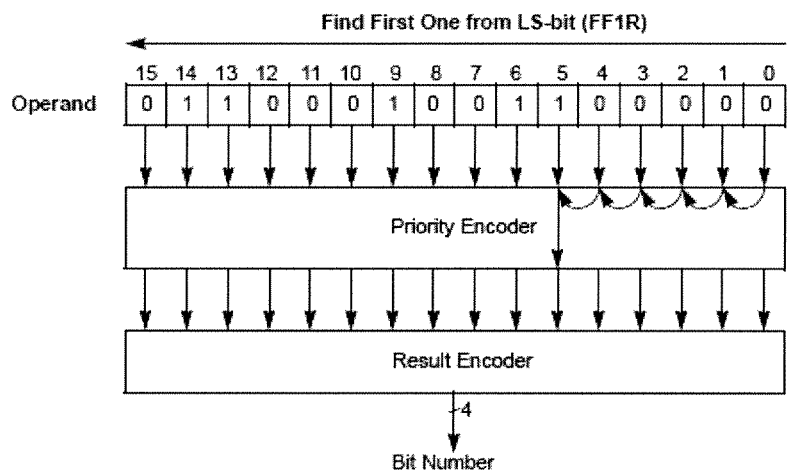
FIG. 19 is a find first instruction hardware block diagram.

All the instruction operate in a similar fashion. An example for FF1R is shown in FIG. 19.

Pseudo Instructions

According to an embodiment of a microcontroller architecture, all registers, including the AccA and AccB can be mapped into the register file address space. This opens up a degree of flexibility for the dual operand DSP instructions that may not be intuitively obvious. For example, a MAC operation could prefetch the current (pre-MAC) accumulator contents as an operand for the next MAC operation.

According to an embodiment, the 8-bit ACCAH and ACCBH registers (AccA<39:32> & AccB<39:32>) are to be automatically sign extended to 16-bits during word or odd byte reads (a read of the MS-byte will return the sign extension byte).

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A processor, comprising:
    at least one multiplier unit which can be controlled to operate in a signed, an unsigned, or a mixed sign mode;
    a multiplier unit mode decoder coupled with the multiplier unit which receives location information of a first and second operands, wherein the multiplier mode decoder controls the multiplier unit when in the mixed sign mode depending on the location information to operate in a signed mode, an unsigned mode, or a combined signed/unsigned mode.

2. The processor according to claim 1, wherein the multiplier unit comprises an n-bit multiplier controllable to perform a signed, an unsigned, or a mixed sign multiplication of two input operands.

3. The processor according to claim 2, wherein the first operand is selected from a first set of two consecutive registers and the second operand is selected from a second set of two consecutive registers.

4. The processor according to claim 1, wherein the multiplier unit comprises:
    a multiplier data pre-processor coupled to the multiplier unit to independently sign or zero extend the two input operands, and
    a signed multiplier.

5. The processor according to claim 4, wherein
    in signed mode, the multiplier data pre-processor signed extends all input data,
    in unsigned mode, multiplier data pre-processor zero extends all input data, and
    in mixed sign mode, the multiplier mode decoder directs the multiplier data pre-processor to sign extend an input if its source is an odd register number or odd memory address, or zero extend an input if its source is an even register number or even memory address.

6. The processor according to claim 4, wherein the signed multiplier is an n+1 bit multiplier.

7. The processor according to claim 1, further comprising a control register to select the signed mode, the unsigned mode, or the mixed sign mode in which an automatic selection of signed, unsigned, or combined sign/unsigned multiplication is performed.

8. The processor according to claim 1, wherein the location information comprises whether a register is an odd or an even register from a plurality of working registers.

9. The processor according to claim 1, wherein first and second operands are supplied by a data memory and the location information comprises whether an address is an odd or an even address in memory.

10. The processor according to claim 1, further comprising a barrel shifter having a size to accommodate at least the size of a result generated by the multiplier.

11. The processor according to claim 10, further comprising an adder coupled with at least one accumulator and the barrel shifter, wherein the multiplier, accumulator, barrel shifter are part of a digital signal processing (DSP) engine.

12. The processor according to claim 11, further comprising a result extension unit coupled between the multiplier and the barrel shifter and a zero-backfill unit coupled with the result extension unit.

13. The processor according to claim 11, further comprising round logic coupled with the accumulator.

14. The processor according to claim 11, wherein the DSP engine is a 16-bit DSP engine having a plurality of 16-bit registers and wherein the barrel shifter and the accumulator each comprise 40-bit.

15. The processor according to claim 11, further comprising a microcontroller unit wherein at least the multiplier is shared by the microcontroller unit and the DSP to execute arithmetic microcontroller instructions.

16. A method for performing a multiplication in a processor comprising the steps of
    providing a first n-bit operand from a first location to a multiplier unit, wherein the multiplier unit can be controlled to operate in signed, unsigned, or a combined sign/unsigned mode;
    providing a second operand from a second location to the multiplier unit;
    decoding the location for the first and second operand and controlling the multiplier unit to operate in a mixed mode in which a signed, an unsigned, or a combined sign/unsigned multiplication is performed depending on the locations.

17. The method according to claim 16, wherein the first and second operands are stored in registers and the location comprises whether a register is an odd or an even register from a plurality of working registers.

18. The method according to claim 16, wherein first and second operands are supplied by a data memory and the location comprises whether an address is an odd or an even address in memory.

19. The method according to claim 17, wherein the first operand is selected from a first set of two consecutive registers and the second operand is selected from a second set of two consecutive registers.

20. The method according to claim 16, wherein a control register determines whether the multiplier unit operates in the a signed, an unsigned, or the mixed mode.

21. The method according to claim 20, wherein the multiplier unit comprises a signed multiplier and:
    in signed mode, the first and second operands are signed extended,
    in unsigned mode, the first and second operands are zero extended, and
    in mixed sign mode, the first or second operand is sign extended if it is supplied by an odd register number or odd memory address, or zero extended if it is supplied by an even register number or even memory address.

22. A method for performing a 2n-bit multiplication using 4 n-bit data words, comprising the steps of:
    storing a first operand of the 2n-bit multiplication in a first set of two consecutive registers or two consecutive memory locations;
    storing a second operand of the 2n-bit multiplication in a second set of two consecutive registers or two consecutive memory addresses;
    performing a first multiplication by a controllable multiplier unit using a first register or memory address of the first set and a first register or memory address of the second set and shifting an associated first result,
    performing a second multiplication by the controllable multiplier unit using the first register or memory address of the first set and a second register or memory address of the second set to generate an associated second result, performing a third multiplication by the controllable multiplier unit using the first register or memory address of the second set and a second register or memory address of the first set to generate an associated third result, wherein for each multiplication, the multiplier unit is automatically controlled to operate in signed, unsigned, or a combined sign/unsigned mode by decoding the location of the register or address;

adding the first, second and third result to generate an end result and storing the end result in registers or memory.

23. The method according to claim 22, wherein the location comprises whether a register is an odd or an even register from a plurality of working registers.

24. The method according to claim 22, wherein the location comprises whether an address is an odd or an even address in memory.

25. The method according to claim 22, wherein a control register determines whether the multiplier operates in signed, unsigned, or a mixed sign mode.

26. The method according to claim 25, wherein
in signed mode, all inputs to a multiplier are signed extended, and
in mixed sign mode, an input to the multiplier is sign extended if it is supplied by an odd register number or odd memory address, or zero extended if it is supplied by an even register number or even memory address.

27. The method according to claim 22, wherein the second and third results are shifted and further comprising the step of performing a fourth multiplication by the controllable multiplier using the second register or memory address of the first set and the second register or memory address of the second set to generate an associated fourth result, and wherein the fourth result is added to the first, second, and third result to generate the end result.

28. The method according to claim 27, wherein a control register determines whether the multiplier unit operates in signed, unsigned, or a mixed sign mode.

29. The method according to claim 28, wherein the multiplier unit comprises a signed multiplier and:
in signed mode, all inputs to the multiplier are signed extended,
in unsigned mode, all input to the multiplier are zero extended, and
in mixed sign mode, an input to the multiplier is sign extended if it is supplied by an odd register number or odd memory address, or zero extended if it is supplied by an even register number or even memory address.

* * * * *